United States Patent [19]
Song et al.

[11] Patent Number: 6,108,448
[45] Date of Patent: *Aug. 22, 2000

[54] SYSTEM AND METHOD FOR EXTRACTING SPATIALLY REDUCED IMAGE SEQUENCES IN A MOTION COMPENSATED COMPRESSED FORMAT

[75] Inventors: Junehwa Song, White Plains; Boon-Lock Yeo, Yorktown Heights, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,669

[22] Filed: Jun. 12, 1997

[51] Int. Cl.[7] .............................. G06K 9/36; G06K 9/32; H04N 7/12

[52] U.S. Cl. ..................... 382/235; 382/250; 382/298; 348/416

[58] Field of Search ..................................... 382/236, 298, 382/235, 250, 248; 348/699, 390, 700, 407, 416; 345/328; 358/136

[56] References Cited

U.S. PATENT DOCUMENTS

| | | | |
|---|---|---|---|
| 5,737,019 | 4/1998 | Kim ......................................... | 348/390 |
| 5,832,120 | 11/1998 | Prabhakar et al. ....................... | 382/250 |
| 5,845,015 | 12/1998 | Martucci ................................. | 283/250 |
| 5,875,039 | 2/1999 | Ohsawa et al. .......................... | 358/435 |
| 5,933,537 | 8/1999 | Hajjahmad et al. ..................... | 382/250 |

OTHER PUBLICATIONS

J. Song et al, "Spatially reduced image extraction from MPEG–2 video: fast algorithms and applications," SPIE, vol. 3312, p. 93–107, 1997.

B. G. Haskell et al., "Digital Video: An Introduction to MPEG–2," Motion Compensation Modes in MPEG, Chapman and Hall, 1997.Pergamon, Pattern Recognition, vol. 28, No. 11, pp. 146–182, 1995.

Boon–Lock Yeo and Bede Liu, "Rapid Scence Analysis on Compressed Video," IEEE Transactions on circuits and Systems for Video Technology, vol. 5, No. 6, Dec. 1995, pp. 533–544.

Boon–Lock Yeo, "On Fast Microscopic Browsing of MPEG Compressed Video," Research Report RC20841, 24 pages, May 7, 1997.

Shih–Fu Chang and David G. Messerschmitt, "Manipulation and Compositing of MC–DCT Compressed Video", IEEE Journal on Selected Areas in Communications, vol. 13, No. 1, pp. 1–11, Jan., 1995.

Boon–Lock Yeo and Bede Liu, "On the Extraction of DC Sequence from MPEG Compressed Video", Information Sciences and Systems Department of Electrical Engineering, Princeton University, Princeton, NJ 08544, 4 pages, Oct. 1995.

Minerva M. Yeung and Bede Liu, "Efficient Matching and Clustering of Video Shots," Department of Electrical Engineering, Princeton University, Princeton, NJ 08544, 4 pages, Oct. 1995.

*Primary Examiner*—Thomas D. Lee
*Assistant Examiner*—Wenpeng Chen
*Attorney, Agent, or Firm*—McGinn & Gibb, P.C; Louis J. Percello, Esq

[57] ABSTRACT

Given compressed video which supports the coding of interlaced frames through DCT and motion compensation, different construction methods are applied based on select DCT domain coefficients and/or motion vector informations to produce spatially reduced images without decompressing. The spatially reduced images can then be used for video browsing, authoring and processing purposes.

22 Claims, 27 Drawing Sheets

CODED MACROBLOCK            (DECODED)
                     DEINTERLACED MACROBLOCK

CODED MACROBLOCK            (DECODED)
                     DEINTERLACED MACROBLOCK

CODED MACROBLOCK
(TOP FIELD)

(DECODED)
DEINTERLACED MACROBLOCK

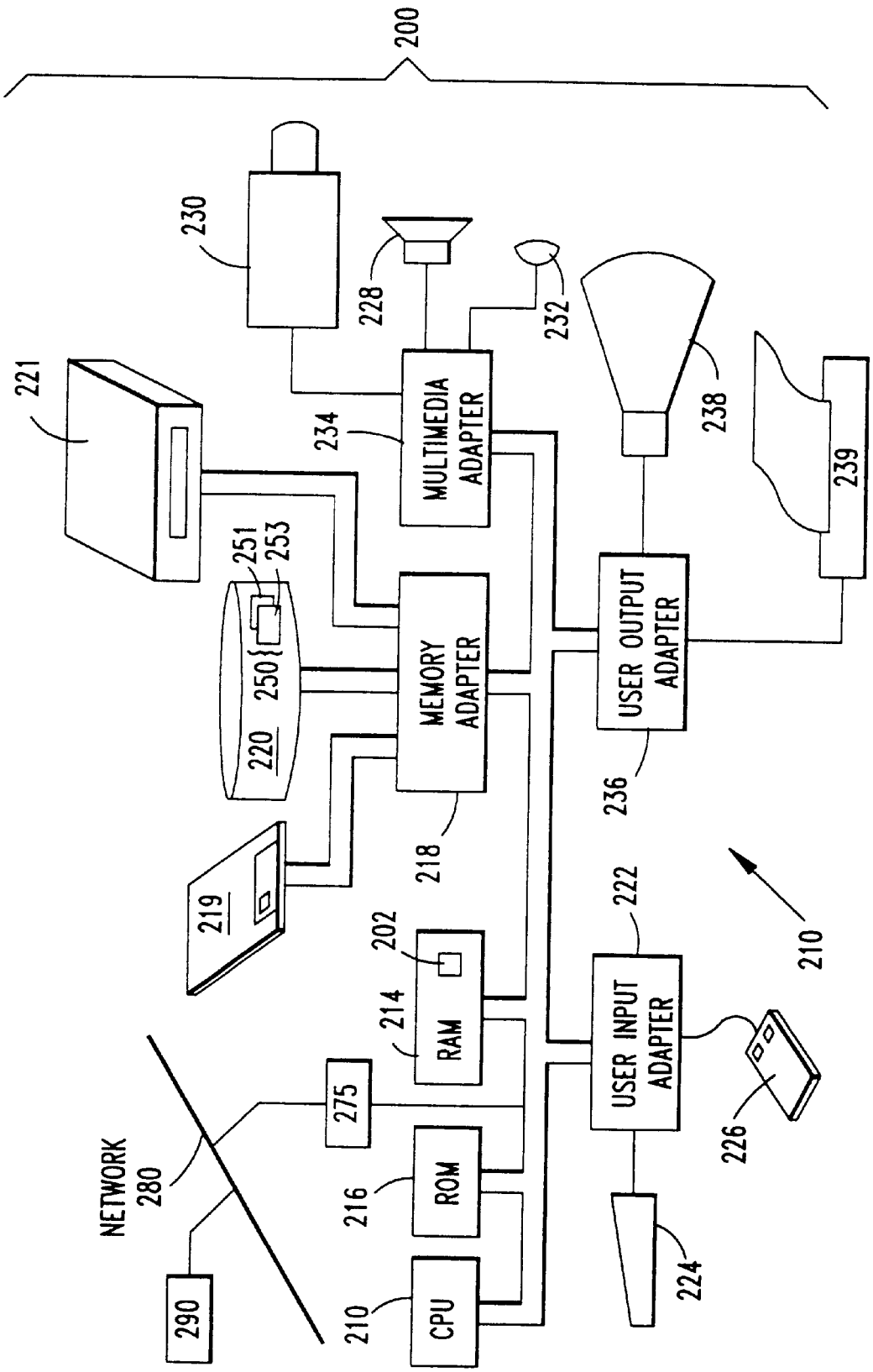

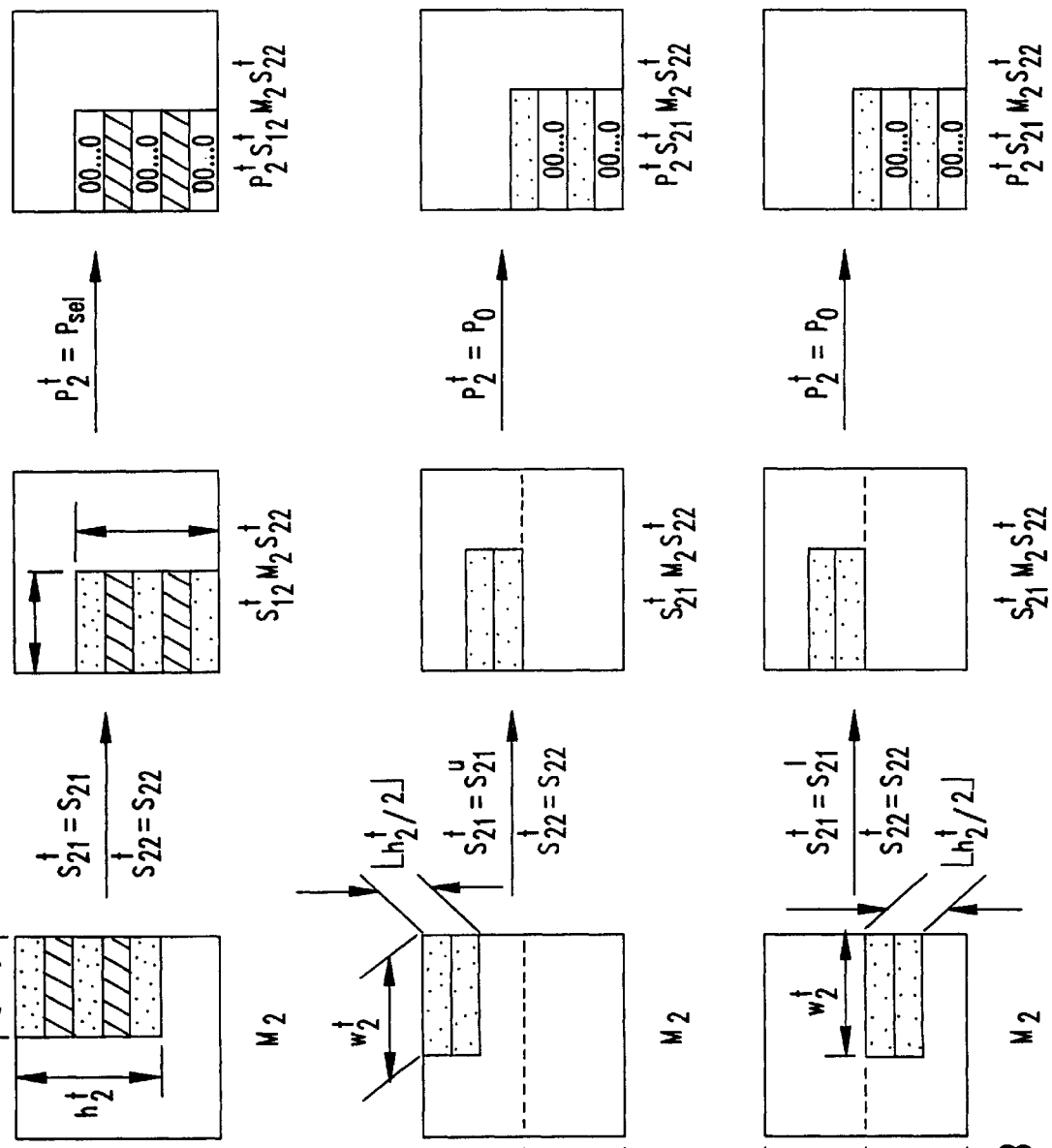

SYSTEM AND METHOD FOR EXTRACTING SPATIALLY REDUCED IMAGE SEQUENCES IN A MOTION COMPENSATED COMPRESSED FORMAT

FIELD OF THE INVENTION

This invention relates to the field of extracting information from a compressed video sequence. More specifically, the invention relates to the field of extracting spatially reduced image sequences from video information in an MPEG-2 compression format without the need for decompression.

BACKGROUND OF THE INVENTION

The MPEG-1 video standard defines three different types of frames (see FIG. 1A): Intra-coded frames (I frames), Predicted frames (P frames), and Bidirectionally predicted frames (B frames). P and B frames are also said to be inter-coded because they are coded based on prior anchor or reference frames. Details of the MPEG-1 standard can be found in ISO/IEC JTC1 CD 11172 Coding of moving pictures and associated audio for digital storage media up to 1.5 Mbits/s, 1992. This reference is incorporated by reference in its entirety. I frames are compressed using intraframe coding, i.e., they do not reference any other frames in the coded streams. Each I frame is divided into 8×8 blocks (typically 112) and a Discrete Cosine Transform (DCT) is taken. Of the 64 DCT coefficients, the DC, AC01 and AC10 are of particular interests. They are illustrated in FIG. 1B. Predicted frames are coded using a motion compensation information from past I frames or P frames. B frames are coded using motion compensation information from either past and/or future I or P frames. P and B frames can also contain intra-coded blocks, which are also coded using DCT as are the blocks in the I frames.

A MPEG-1 bit stream has a hierarchical representation with six layers: a sequence layer, a group of pictures layer, a picture layer, a slice layer, a macroblock layer, and a block layer. The sequence layer is the top coding layer. A group of pictures layer (GOP) is a set of pictures in contiguous display order. It contains at least one I frame. Each picture corresponds to a frame. Each picture is divided into slices. A slice is divided into macroblocks. A macroblock is composed of 6 blocks 112, four blocks for luminance, and two for chrominances. Further details of MPEG-1 standard can be found in ISO/IEC JTC1 CD 11172 Coding of moving pictures and associated audio for digital storage media up to 1.5 Mbits/s, 1992.

The details of a process of reduced image generation can be found in "On the extraction of DC sequences from MPEG compressed video", (by B. L. Yeo and B. Liu, *International Conference on Image Processing*, Vol. II, pp. 260–263, 1995). This reference is incorporated by reference in its entirety. A DC image is composed of block-wise averages of 8×8 blocks. For the I-frame of an MPEG-1 coded video, each pixel in the DC image corresponds to a scaled version of the DC coefficient of each DCT block.

A generic extraction of the DC images from P and B frames is shown in FIG. 1C. Here, $P_{ref}$ 131D is the target block of interest and is inter-coded. It is desired to convert it into an intra-coded DCT format so that the DC coefficient can be extracted. $P_0, \ldots, P_3$ (134,135,136 and 137) are the four original intra-coded neighboring blocks (called anchor blocks) from which $P_{ref}$ is derived and the motion vector is ($\Delta x$, $\Delta y$). The motion vector ($\Delta x$, $\Delta y$) 150 is part of the motion compensation information associated with the block $P_{ref}$. The shaded regions 134P, 135P, 136P and 137P in the anchor blocks $P_0, \ldots, P_3$, called the contributing subblocks, are moved by ($\Delta x$, $\Delta y$). Thus, the DC coefficients of $P_{ref}$ are derived for DC image sequences.

The relation of inter-coded $P_{ref}$ with respect to $P_i$ is derived in "Manipulation and compositing of MC-DCT compressed video", (by S. F. Chang and D. G. Messerschmitt, *IEEE Journal on Selected Areas in Communications: Special Issue on Intelligent Signal Processing*, vol. 13, pp. 1–11, January 1995). This reference is incorporated by reference in its entirety. If we represent each block as an 8×8 matrix, then we can describe in the spatial domain through matrix multiplications:

$$P_{ref} = \sum_{i=0}^{3} S_{i1} P_i S_{i2}$$

where $S_{ij}$ are matrices like $$L_n = \begin{pmatrix} 0 & 0 \\ I_n & 0 \end{pmatrix} \text{ or } R_n = \begin{pmatrix} 0 & I_n \\ 0 & 0 \end{pmatrix}.$$

Each $I_n$ is an identity matrix of size n. An example of such an effect of $S_{ij}$ on P is demonstrated in FIG. 1D. The goal is to move the subblock from the upper left corner to the lower right corner, and also to set the remaining values in the blocks to be zeros. The pre-multiplication shifts the sub-block of interest vertically while post-multiplication shifts the sub-block horizontally. There are four possible locations of the subblock of interest: upper-left, upper-right, lower-right and lower-left. The actions in terms of matrices are tabulated in Table 1.

While the value of $S_{ij}$ is clear from Table 1 with the given values of $h_i$ and $w_i$, we will sometime write $S_{ij}$ as a function of $h_i$ and $w_i$. For example, $S_{01} = S_{01}(h_0, w_0) = S_{01}(h_0)$.

Denoting the 2D DCT of an 8×8 block P as DCT(P), we can express the DC coefficient of DCT($P_{ref}$) as:

$$(DCT(P_{ref}))_{00} = \sum_{i=0}^{3} \left( \sum_{m=0}^{7} \sum_{l=0}^{7} w_{ml}^{i} (DCT(P_i))_{ml} \right), \quad (1)$$

for some weighting coefficients $w_{ml}^{i}$.

A key result of "On the extraction of DC sequences from MPEG compressed video", (by B. L. Yeo and B. Liu, *International Conference on Image Processing*, Vol. II, pp. 260–263, 1995) is that $$\omega_{00}^{i} = \frac{h_i \omega_i}{64},$$

TABLE 1

| | Matrices $S_{i1}$ and $S_{i2}$ | | |
|---|---|---|---|
| Subblock | Position | $S_{i1}$ | $S_{i2}$ |
| $P_0$ | lower right | $\begin{pmatrix} 0 & I_{h_0} \\ 0 & 0 \end{pmatrix}$ | $\begin{pmatrix} 0 & 0 \\ I_{w_0} & 0 \end{pmatrix}$ |

TABLE 1-continued

Matrices $S_{i1}$ and $S_{i2}$

| Subblock | Position | $S_{i1}$ | $S_{i2}$ |
|---|---|---|---|
| $P_1$ | lower left | $\begin{pmatrix} 0 & I_{h_1} \\ 0 & 0 \end{pmatrix}$ | $\begin{pmatrix} 0 & I_{\omega_1} \\ 0 & 0 \end{pmatrix}$ |
| $P_2$ | upper right | $\begin{pmatrix} 0 & 0 \\ I_{h_2} & 0 \end{pmatrix}$ | $\begin{pmatrix} 0 & 0 \\ I_{\omega_2} & 0 \end{pmatrix}$ |
| $P_3$ | upper left | $\begin{pmatrix} 0 & 0 \\ I_{h_4} & 0 \end{pmatrix}$ | $\begin{pmatrix} 0 & I_{\omega_3} \\ 0 & 0 \end{pmatrix}$ | i.e., the weight $w_{00}{}^i$ is the ratio of overlaps of the block $P_{ref}$ with block $P_i$. An approximation, called the first-order approximation, approximates $(DCT(P_{ref}))_{00}$ by $$DC(P_{ref}) \approx \sum_{i=0}^{3} \frac{h_i w_i}{64} DC(P_i).$$

This approximation requires only the motion vector information and the DC values in the reference frames. It is shown in "On the extraction of DC sequences from MPEG compressed video", (by B. L. Yeo and B. Liu, *International Conference on Image Processing*, Vol. II, pp.260–263, 1995) that such approximation, when applied to B and P frames, yields good results in practice.

The use of DC images extracted directly from MPEG-1 video has led to efficient algorithms for processing MPEG-1 video. Example enabling applications are documented in "Rapid scene analysis on compressed videos" (by B. L. Yeo and B. Liu, *IEEE Transactions on Circuits and Systems For Video Technology*, vol.5, pp.533–544, December 1995) and "Efficient Matching and Clustering of Video Shots" (by M. M. Yeung and B. Liu, *International Conference on Image Processing*, Vol. I, pp. 338–341, 1995). These references are incorporated by reference in their entirety.

For the I frame of a MPEG-1 video, we define a DC+2AC as follows: for each 8×8 DCT block, the DC and two lower order AC coefficients, $AC_{0,1}$, and $AC_{1,0}$ are retained, and a 2×2 inverse DCT is taken to obtain 4 pixels. For B and P frames, equation (2) is used for constructing the DC and two lower order AC coefficients of $P_{ref}$ from the DC and two order AC coefficients of DCT blocks $P_i$'s.

$$(DCT(P_{ref}))_{a,b} \approx \sum_{i=0}^{3} \left( \sum_{m+l \leq 1} c(h_i, w_i, a, m, l, b)(DCT(P_i))_{m,l} \right) \quad (2)$$

for $a+b \leq 1$. Here, $h_i$ and $w_i$ are the height and width of block $P_i$ (FIG. 1C) respectively. Further details can be found in "On Fast Microscopic Browsing of MPEG compressed video" (by B. L. Yeo, IBM T. J. Watson Research Center, Technical Report RC20841, May 1997). This reference is incorporated by reference in its entirety.

MPEG-2 video is intended for higher data rates and has uses for broadcasting with high-quality video, whereas MPEG-1 is intended for data rates on the order of 1.5 Mbit/s. MPEG-2 supports much broader range of applications and modes of operations. It maintains all of the MPEG-1 video syntax, and uses extensions for additional flexibility and functions. MPEG-2 also supports the coding of interlaced video and scalable data streams. MPEG-1 does not support interlaced video, only non-interlaced (progressive) video.

In interlaced video, each frame is comprised of two fields, a top field and a bottom field. In MPEG-2, each field could be coded as a separate picture (field picture) or as a complete frame (frame picture). Frame pictures and field pictures could be mixed in a MPEG-2 data stream. The DCT coefficients for field pictures are always organized as independent fields. However, in a frame picture, DCT can be done either on fields or frames on a macroblock basis. That is, a frame picture could have both frame-coded macroblocks and field-coded macroblocks.

FIGS. 1E, 1F and 1G show different formats of DCT coded macroblocks possible in an MPEG-2 video. FIG. 1E is a drawing showing a representation of prior art field DCT coding in a frame picture in the MPEG-2 video standard. FIG. 1F is a drawing showing a representation of prior art frame DCT coding in a frame picture in the MPEG-2 video standard. FIG. 1G is a drawing showing a representation of prior art of a coded macroblock in a field picture in the MPEG-2 video standard.

Motion compensation (MC) in MPEG-2 is also more general than those in MPEG-1. There are two basic modes of motion compensations: field-based motion compensation and frame-based motion compensation. In field-based MC, two motion vectors are used to specify the translations of the top and bottom fields (the mode field-based MC and the two motion vectors constitute the motion compensation information for field-based MC). In frame-based MC, only one motion vector is used (the mode frame-based MC and the motion vector constitutes the motion compensation information for field-based MC). Frame-based MC is similar to what is done in MPEG-1. In field pictures, only field-based MC can be used, whereas in frame pictures, both frame-based and field-based MC are allowed.

The two cases are illustrated in FIG. 1H and FIG. 1I. FIG. 1H is a drawing showing prior art frame prediction in a frame picture or prediction in a field picture in the MPEG-2 video standard. FIG. 1I is a drawing showing prior art field prediction in a frame picture in the MPEG-2 video standard.

In summary, one difference between MPEG-2 and MPEG-1 is the support of coding of interlaced video through the use of DCT and/or motion compensation of the interlaced frames through either frame or field encoding.

To improve prediction efficiency, MPEG-2 further supports the 16×8 motion-compensation mode. This mode allows a macroblock to be treated as an upper 16×8 region and a lower 16×8 region. Each region is then independently motion-compensated. Another mode is the dual-prime motion prediction.

It averages the predictions from two adjacent fields of opposite parity when coding a given field or frame. Dual-primal motion prediction tends to reduce the noise in the data.

Details of MPEG-2 standards can be found in ISO/IEC JTC1 CD 13818 Generic Coding of moving pictures and associated audio, 1994, *MPEG Video Compression Standard* (by J. L. Mitchell, W. B. Pennebaker, C. E. Foog and D. J. Le Gall, Chapman and Hall, 1996) and *Digital Video: An Introduction to MPEG-2* (by B. G. Haskell, A.Puri, and A. N. Netravali, Chapman and Hall, 1997). These references are incorporated by reference in their entirety.

Notations

In this disclosure, the following notational conventions are used. We represent an 8×8 (16×16) data block (macroblock) as an 8×8 matrix (16×16 matrix), or vice versa, when there is no confusion. We denote spatial domain blocks or macroblocks (or matrices) with capital letters, (e.g., D, D', $D_i$, P, etc) and the corresponding DCT domain blocks (or matrices) by the same capital letters with hats (e.g., $\hat{D}_i$, $\hat{P}_i$, etc), that is, for a 8×8 block represented by the matrix D, we have $$\hat{D}=DCT(D)=TDT^t, \qquad (3)$$

where T is the 8×8 DCT matrix with entries t(i,j) (i denotes the i th row and j denotes the j th column) given by $$t(i, j) = \frac{1}{2}k(i)\cos(2j+1)i\frac{\pi}{16}, \qquad (4)$$

where $$k(i) = \begin{cases} \frac{1}{\sqrt{2}}, & i = 0; \\ 1, & \text{otherwise}. \end{cases} \qquad (5)$$

We also explicitly use DCT to denote the DCT domain value of a block when clearer notation is required. For example, DCT(AB) denotes the 2D-DCT applied to the matrix product AB. We will also make constant use of the distributive property of 2D DCT:

$$DCT(AB)=DCT(A)DCT(B)=\hat{A}\hat{B}. \qquad (6)$$

Thus, we can write the 2D-DCT of $$P_{ref} = \sum_{i=0}^{3} S_{i1} P_i S_{i2}$$

for describing the movement of subblock in the spatial domain as $$DCT(P_{ref}) = \sum_{i=0}^{3} DCT(S_{i1})DCT(P_i)DCT(S_{i2}).$$

in the DCT domain. The conversion from inter-coded block $P_{ref}$ to intra-coded DCT block $DCT(P_{ref})$ directly in the DCT domain using only the DCT values of $P_i$'s and the motion vector ($\Delta x$, $\Delta y$) 150 is called DCT domain inverse motion compensation. For simplicity of notation, we will describe the movement of subblocks in the spatial domain in this disclosure; the DCT domain values of the blocks can be similarly deduced from equation (6).

A non-interlaced 16×16 macroblock is denoted by a simple capital letter (e.g., D) whereas the corresponding interlaced macroblock is denoted by a primed capital letter (e.g., D'). Given a non-interlaced macroblock D, we denote the four component 8×8 blocks by $D_0$, $D_1$, $D_2$, and $D_3$, i.e., D=

$$\begin{pmatrix} D_0 & D_1 \\ D_2 & D_3 \end{pmatrix}.$$

Similarly for the corresponding interlaced macroblock D', its four component blocks are denoted by $D'_0$, $D'_1$, $D'_2$, and $D'_3$, i.e., D'=

$$\begin{pmatrix} D'_0 & D'_1 \\ D'_2 & D'_3 \end{pmatrix}.$$

Each component in a block (matrix) is referenced by two indices, i.e., $A_{ij}$ represents the component at row i and column j in a block (matrix) A. To represent a row or column vector of a matrix, we use a—, i.e., $A_{i\_}$ represents the ith row vector and $A_{\_i}$ the ith column vector.

Consider a non-interaced 16×16 macroblock D=

$$\begin{pmatrix} D_0 & D_1 \\ D_2 & D_3 \end{pmatrix},$$

where $D_i$, i=0,1, 2, 3, is an 8×8 block. Similarly, let D'=

$$\begin{pmatrix} D'_0 & D'_1 \\ D'_2 & D'_3 \end{pmatrix}$$

be the corresponding interlaced macroblock, i.e., $D'_0$ and $D'_1$ correspond to the top field of D, and $D'_2$ and $D'_3$ correspond to the bottom field of D. The relationship between D and D' can be described using a 16×16 permutation matrix P as $$D=PD' \qquad (7)$$

where P=

$$\begin{pmatrix} P_0 & P_1 \\ P_2 & P_3 \end{pmatrix}$$

and $$P_0 = \begin{pmatrix} 1 & 0 & 0 & 0 & 0 & 0 & 0 & 0 \\ 0 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 0 & 0 \\ 0 & 0 & 1 & 0 & 0 & 0 & 0 & 0 \\ 0 & 0 & 0 & 0 & 0 & 0 & 0 & 0 \\ 0 & 0 & 0 & 1 & 0 & 0 & 0 & 0 \\ 0 & 0 & 0 & 0 & 0 & 0 & 0 & 0 \end{pmatrix} \quad P_1 = \begin{pmatrix} 0 & 0 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 0 & 0 \\ 0 & 0 & 1 & 0 & 0 & 0 & 0 & 0 \\ 0 & 0 & 0 & 0 & 0 & 0 & 0 & 0 \\ 0 & 0 & 0 & 1 & 0 & 0 & 0 & 0 \end{pmatrix} \qquad (8)$$

$$P_2 = \begin{pmatrix} 0 & 0 & 0 & 0 & 1 & 0 & 0 & 0 \\ 0 & 0 & 0 & 0 & 0 & 0 & 0 & 0 \\ 0 & 0 & 0 & 0 & 0 & 1 & 0 & 0 \\ 0 & 0 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 0 & 0 \end{pmatrix} \quad P_3 = \begin{pmatrix} 0 & 0 & 0 & 0 & 0 & 0 & 0 & 0 \\ 0 & 0 & 0 & 0 & 1 & 0 & 0 & 0 \\ 0 & 0 & 0 & 0 & 0 & 0 & 0 & 0 \\ 0 & 0 & 0 & 0 & 0 & 1 & 0 & 0 \\ 0 & 0 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 0 \\ 0 & 0 & 0 & 0 & 0 & 0 & 0 & 1 \end{pmatrix}$$

STATEMENT OF PROBLEMS WITH THE PRIOR ART

The prior art fails to process interlaced video frames in the DCT domain.

The prior art does not provide a convenient way to process inter-coded frames in MPEG-2 compressed video without decompression.

The prior art does not teach the way to construct an intra-frame DCT coded frame from an inter-frame motion compensated coded frame for an MPEG-2 compressed video (this process is called DCT domain inverse motion compensation).

The prior art fails to provide a way to extract spatially reduced images sequence from MPEG-2 compressed video sequences without the need for decompression.

The prior art does not teach the use of spatially reduced images extracted from interlaced video frames coded using motion compensated and DCT for video processing tasks.

The prior art prohibits analysis of large video databases with video coded using schemes which include coding of interlaced video using DCT and motion compensation as in MPEG-2.

The prior art prohibits indexing and retrieval in large video databases which includes MPEG-2 video.

The prior art fails to provide a random access to frames in MPEG-2 video.

OBJECTS OF THE INVENTION

An object of this invention is a system and method for constructing spatially reduced image sequences in motion compensated compressed format.

An object of this invention is a system and method for efficient construction of spatially reduced image sequences in motion compensated compressed format without full decompression.

An object of this invention is a system and method for indexing and/or searching video information.

An object of this invention is a system and method for efficient browsing of video information.

An object of this invention is a system and method for efficient browsing of video information which allows random access to individual frames in video sequence.

SUMMARY OF THE INVENTION

Given compressed video which supports the coding of interlaced frames through DCT and motion compensation, the present invention applies different construction methods based on select DCT domain coefficients and/or motion vector information to produce spatially reduced images without decompressing. The spatially reduced images can then be used for video browsing, authoring and processing purposes.

BRIEF DESCRIPTION OF THE DRAWINGS

The foregoing and other objects, aspects and advantages will be better understood from the following detailed description of preferred embodiments of the invention with reference to the drawings that are include the following:

FIG. 2 is a block diagram showing one preferred embodiment of a computer system executing the present invention.

FIG. 8 is a block diagram showing field-based motion compensation and an anchor block that is frame coded.

FIG. 9A is a block diagram showing field-based motion compensation where the achor block is field coded and the contributing sub-block comes from an upper region.

FIG. 9B is a block diagram showing field-based motion compensation where the achor block is field coded and the contributing sub-block comes from an lower region.

DETAILED DESCRIPTION OF THE INVENTION

Figure 1A:
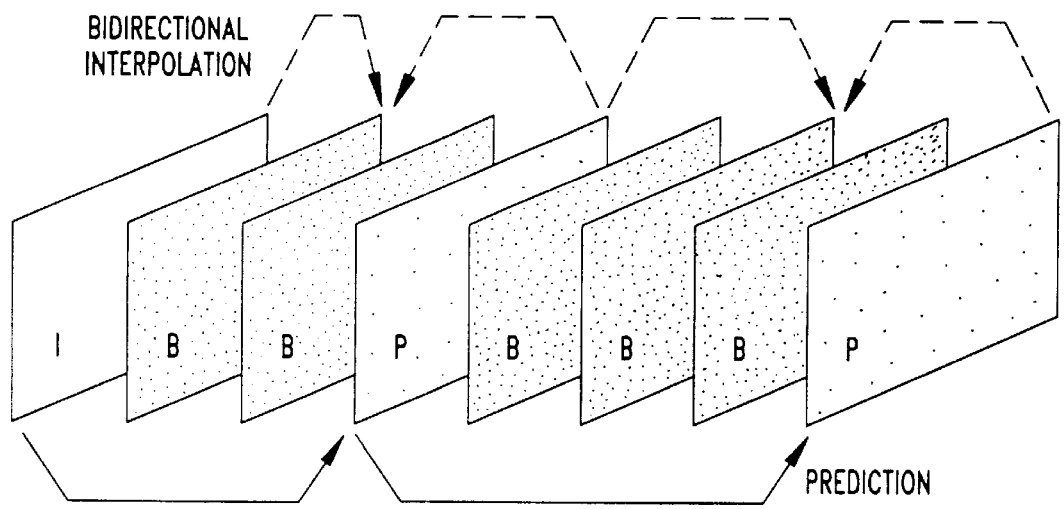
FIG. 1A is a drawing showing three different prior art frame types in the MPEG video standard.
Figure 1B:
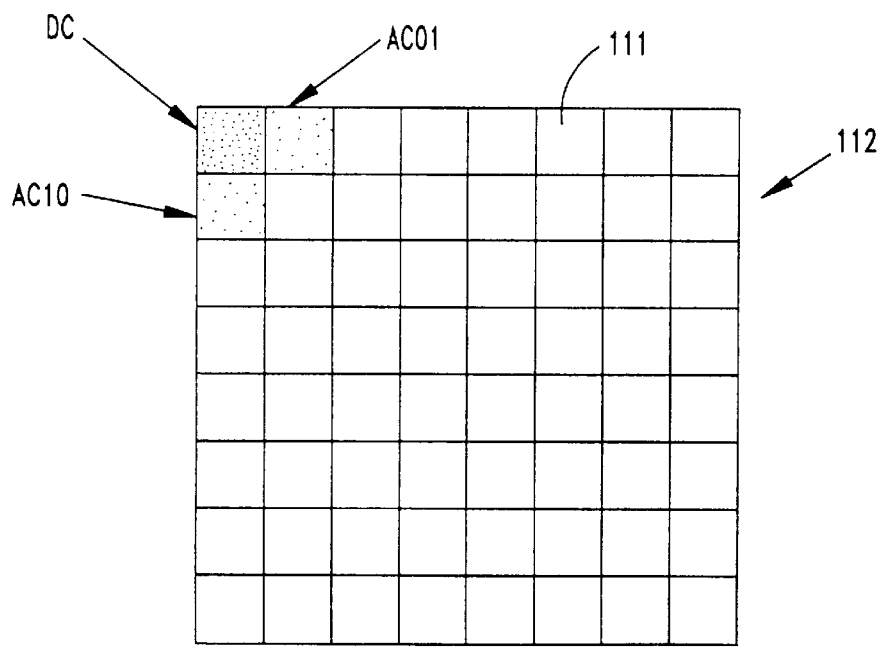
FIG. 1B is a drawing of a prior art 8×8 Discrete Cosine Transform (DCT) block in the MPEG video standard.

FIG. 2 is a block diagram showing a computer system 200, e.g. an IBM RISC System/6000 (Trademark of the IBM corporation) on which a preferred embodiment of the present invention operates. Components in the computer system 200 are connected by and communicate over a system bus 212. A central Processing Unit (CPU) 210, Read Only Memory (ROM) 216, and Random Access Memory (RAM) 214, typically are connected to the system bus 212. The preferred embodiment includes one or more application programs 202. One type of application program 202 is a process 300 further described in FIG. 3. Additional memory, e.g., diskettes 219, disks 220, and CDROM 221, can be connected to the system bus 212 by appropriate memory adaptors 218. Input/output adaptors (222, 236) connect devices to the system bus 212 that interact with a user. For example, a keyboard 224 and/or mouse 226 input are connected to the system bus 212 through an appropriate user input adapter 222 as a display (e.g. a Graphical User Interface, GUI) 238 and/or printer 239 are connected to the system bus 212 through an appropriate User Output Adapter 236. For example, a User Output Adapter 236 used to control a GUI would be an IBM RISC System/6000 Color Graphics Display Adaptor 236. Multimedia functions can be added to the system 200 by using an appropriate Multimedia Adapter 234 like the ActionMedia II Display Adapter 234 (described in the IBM ActionMedia II Technical Reference). Adapters like this are used to input and output audio signals through audio input devices (e.g. a microphone ) 232 and audio output devices (e.g. one or more loud speakers) 228. Video input (e.g. through a camera) 230 and video output 238 is also enabled by adaptors like these. Speech recognition can be accomplished by using an IBM VoiceType Dictation Adapter 234. User interfaces (222, 236) for other functions, e.g., virtual reality systems, can be connected to the system bus 212. Appropriate connectors 275 can be used to connect the computer system 200 to a general network (e.g., the internet, wide area network (WAN), and/or local area network (LAN)) 280 on which communicate servers 290 and/or clients. Some of these computers 290 are capable of performing the same functions of system 200. Hardware for computer systems like this 200 is well known.

FIGS. 3 to 6 are flow charts describing various processes performed by the invention to extract spatially image sequences from MPEG-2 video. FIGS. 7 to 11 are block diagrams that illustrate changes to the video as a result of performing these processes. Given an MPEG-2 video, or more generally, any compressed video which supports the coding of interlaced frames through DCT and motion compensation as in MPEG-2, our invention extracts a spatially reduced image sequence from different frames with different encoding frame types (i.e., I, P and B) without the need for decompression. (In this disclosure, any compressed video which supports the coding of interlaced frames through DCT and motion compensation will be referred to as MPEG-2 video, without loss of generality.) Depending on the frame type and the specifics of the encoding modes, our invention applies different extraction methods based on select DCT domain coefficients and/or motion vector information. The spatially reduced images can then be used for video browsing, authoring and processing purposes.

Figure 3:
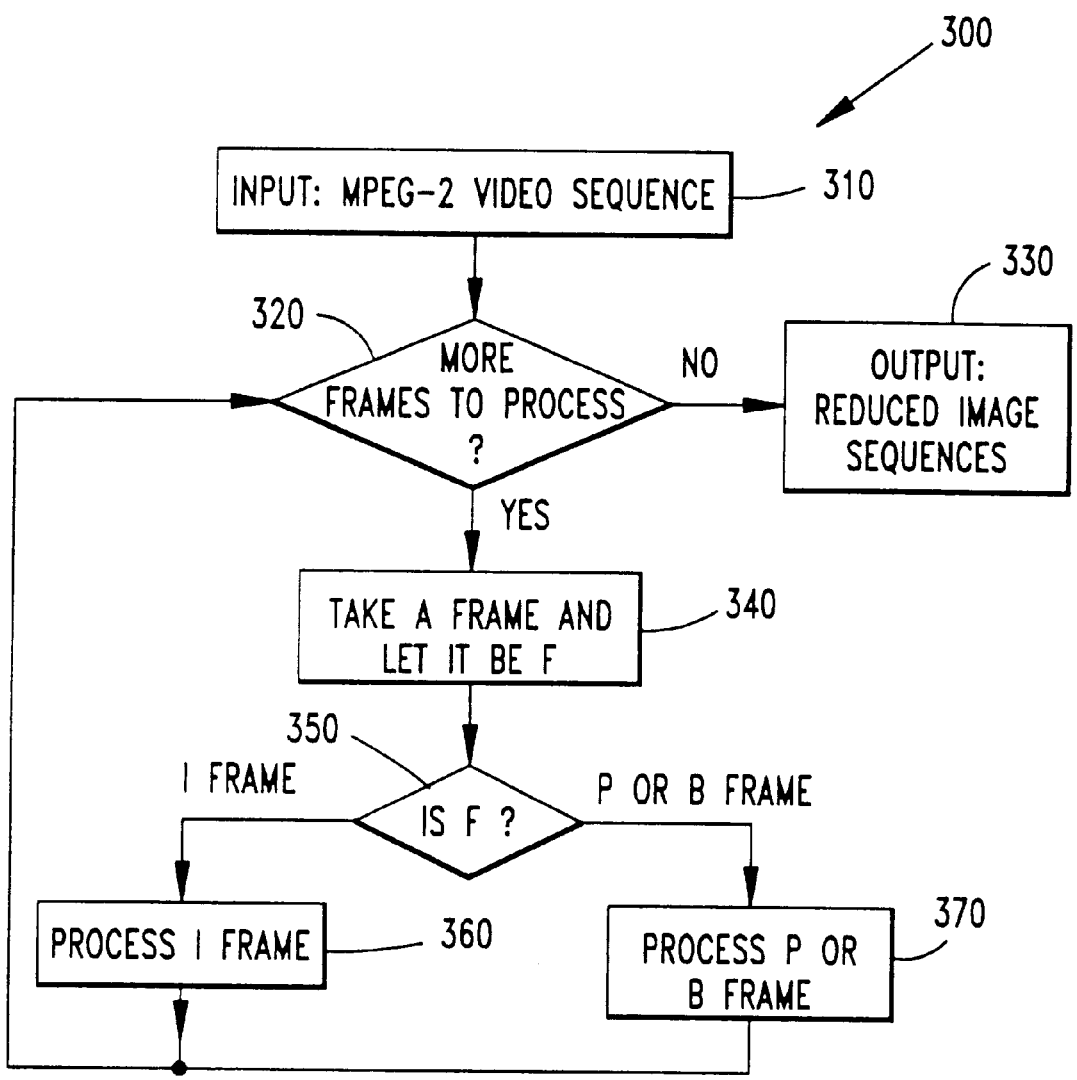
FIG. 3 is a flow chart showing the steps of the constructor for a reduced image sequence from an MPEG-2 video.

FIG. 3 is a flow chart which describes the overall process 300 of constructing a reduced image sequence from MPEG-2 video. In Step 310, a MPEG-2 video sequence is taken as input. This video sequence has headers with descriptions of the type of frames contained in data packets associated with the header. This is well known. In Step 320, header information is examined using known techniques to determined if there are more frames to process. If not, the reduced image sequence generated so far is output 330 and the process is finished. If there are more frames to process, the next frame is taken as the current frame which is named as F in Step 340. Step 350 tests if the current frame F is I frame, P frame, or B frame. Information in the headers is provided to classify these frames this way. If it is I frame, current frame F is processed in Step 360. Otherwise, the current frame F is processed in Step 370. After the current frame F is processed in Block 360 or 370, the process goes to block 320 and continues.

Figure 4:
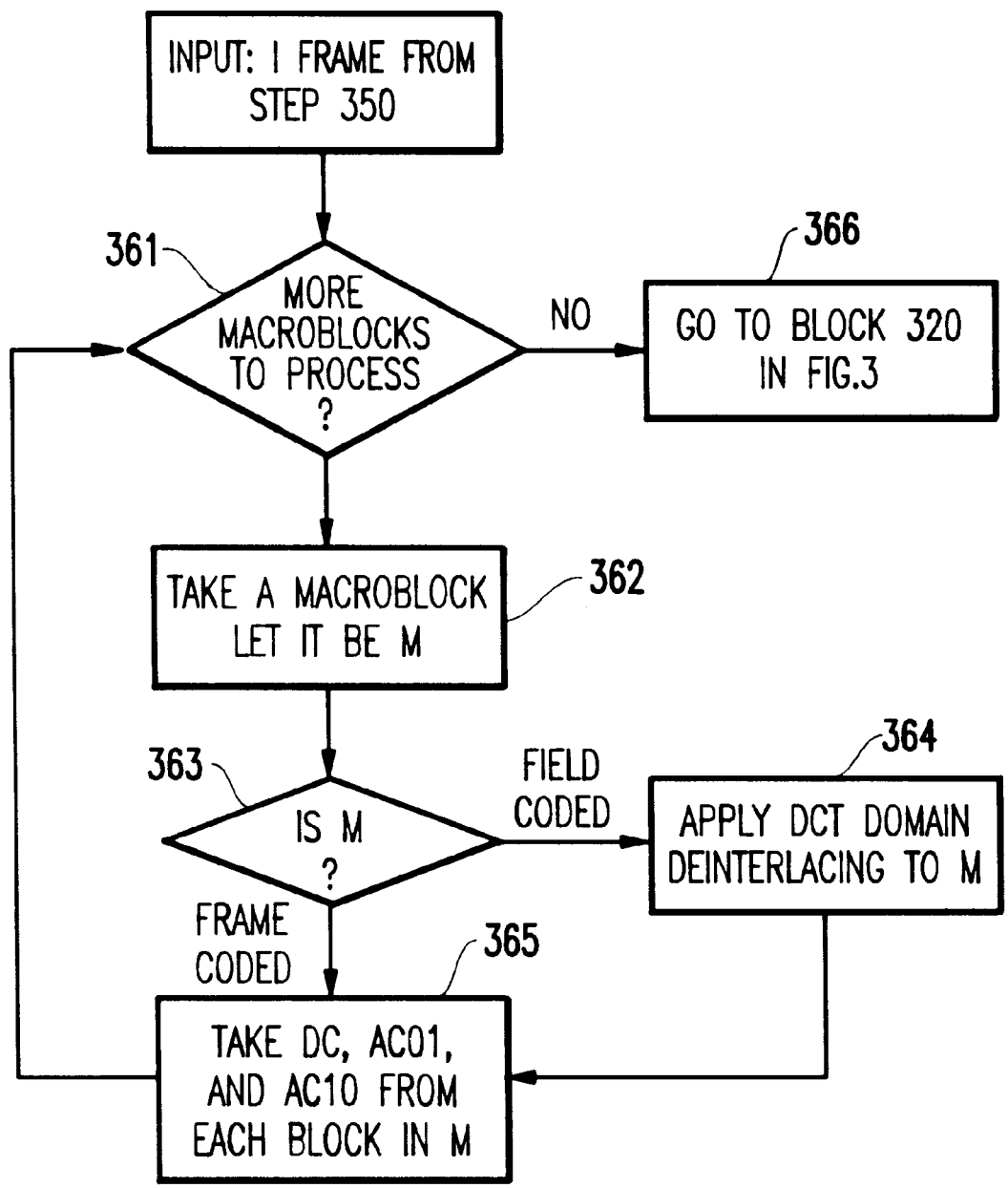
FIG. 4 is a flow chart showing the steps of constructing reduced image sequences from I frames.

FIG. 4 is a flow chart which shows details of Step 360 in FIG. 3 and describes the steps of processing I frames to construct reduced images. Step 361 determines if the current frame has more macroblocks to process. If not, as shown in Step 366, the process is returned to Step 320 in FIG. 3. If there are more macroblocks to process, the next macroblock is taken as the current macroblock (named M) in Step 362. Then, Step 363 determines if the current macroblock M is frame-DCT coded or field-DCT coded based on the header information in the MPEG-2 bitstream. If it is frame-DCT coded, it is given to Step 365. If it is field-DCT coded, a DCT domain deinterlacing operation is applied to M in Step 364 (the detailed preferred embodiment will be presented later in the disclosure) and successively given to Step 365. In Step 365, DC, AC10 and AC01 values are taken from the current macroblock M, and the process 360 returns to Step 361. The DC component represents the average intensity value of its respective block and the AC10 and AC01 values represent various lowest frequency components of intensity variation in the block. Note that other frequency coefficients, e.g., 111 can be used in alternative embodiments. However, in a preferred embodiment these two lowest frequency components are chosen because along with the DC component they give enough rapidly and efficiently create a reduced size block an adequate amount of information contained in the original block.

The purpose of process 360 (in a preferred embodiment) is to identify the DC, AC10, and AC01 components of a frame coded macroblock. This is straight forward if the macroblock is frame coded 365. However, if the macroblock is field coded 364, the macroblock needs to be converted into to a frame coded format in order to identify the required coefficients. A preferred embodiment describing how to do this is given below.

A more rigorous description of FIG. 4 is now disclosed. At step 362, suppose M is a field-coded macroblock consisting of 4, 8×8 DCT blocks DCT(D'$_i$). To obtain the DC coefficients of the deinterlaced version of DCT(D$_i$)$_{00}$ has to be computed.

One preferred method for computing the DC coefficients of DCT(D$_i$)'s for the macroblock is based on a weighted linear combination of DCT coefficients in the field-coded blocks:

$$(\hat{D}_0)_{00} = (\hat{P}_0 \hat{D}'_0)_{00} + (\hat{P}_1 \hat{D}'_2)_{00} \qquad (9)$$

$$= (\hat{P}_0)_{0_-}(\hat{D}'_0)_{-0} + (\hat{P}_1)_{0_-}(\hat{D}'_2)_{-0}$$

$$= (\hat{P}_0)_{0_-}((\hat{D}'_0)_{-0} + (\hat{D}'_2)_{-0}),$$

where, the weights used for the linear combinations is:

$$(\hat{P}_0)_{0_-} = (0.5, 0.453, 0, -0.159, 0, 0.106, 0, -0.090). \tag{10}$$

Only 5 multiplications are needed. In an alternative embodiment, only 3 multiplications are used if the last two non-zero coefficients are ignored. Ignoring these last two non-zero coefficients creates enough resolution in the reduced size block for some applications such as browsing, shot boundary detection, etc.

A preferred embodiment of computing $(\hat{D}_2)_{00}$ without using any multiplications uses the results of $(\hat{D}_0)_{00}$:

$$(\hat{D}_2)_{00} = ((\hat{D}'_0)_{00} + (\hat{D}'_2)_{00}) - (\hat{D}_0)_{00} \tag{11}$$

Likewise, the DC values for $D_1$ and $D_3$ can be computed by the following equations:

$$(\hat{D}_1)_{00} = (\hat{P}_0)_{0_-}(\hat{D}'_1)_{-0} + (\hat{D}'_3)_{-0}) \tag{12}$$

$$(\hat{D}_3)_{00} = ((\hat{D}'_1)_{00} + (\hat{D}'_3)_{00}) - (\hat{D}_1)_{00} \tag{13}$$

Therefore, the construction of a DC value for a non-interlaced block requires at most 2.5 multiplications (5/2=2.5). If the last two non-zero coefficients of Equation (10) is also ignored, only 1.5 multiplications (3/2=1.5) are needed.

Again, at step 362, if M is a field-coded macroblock, it may be necessary to generate low order AC coefficients (e.g., AC01 and AC10) of a frame-coded macro-block from a corresponding field-coded macro-block. A preferred embodiment to compute the weighted linear combination performs step 364 as follows:

$$(\hat{D}_0)_{01} \approx (\hat{P}_0)_{00}((\hat{D}'_0)_{01} + (\hat{D}'_2)_{01}) \tag{14}$$

$$(\hat{D}_0)_{10} \approx (\hat{P}_0)_{10}(\hat{D}'_0)_{00} + (\hat{P}_0)_{11}(\hat{D}'_0)_{10} + (\hat{P}_1)_{10}(\hat{D}'_2)_{00} + (\hat{P}_1)_{11}(\hat{D}'_2)_{10} \tag{15}$$

$$= (\hat{P}_0)_{10}((\hat{D}'_0)_{00} - (\hat{D}'_2)_{00}) + (\hat{P}_0)_{11}(\hat{D}'_0)_{10} + (\hat{P}_1)_{11}(D'_2)_{10}$$

$$(\hat{D}_2)_{01} \approx ((\hat{D}'_0)_{01} + (\hat{D}'_2)_{01}) - (\hat{D}_0)_{01} \tag{16}$$

$$(\hat{D}_2)_{10} \approx (\hat{P}_2)_{10}(\hat{D}'_0)_{00} + (\hat{P}_2)_{11}(\hat{D}'_0)_{10} + (\hat{P}_3)_{10}(\hat{D}'_2)_{00} + (\hat{P}_3)_{11}(\hat{D}'_2)_{10}$$

$$= (\hat{P}_2)_{10}((\hat{D}'_0)_{00} - (\hat{D}'_2)_{00}) + (\hat{P}_2)_{11}(\hat{D}'_0)_{10} + (\hat{P}_3)_{11}(\hat{D}'_2)_{10}$$

Figure 5:
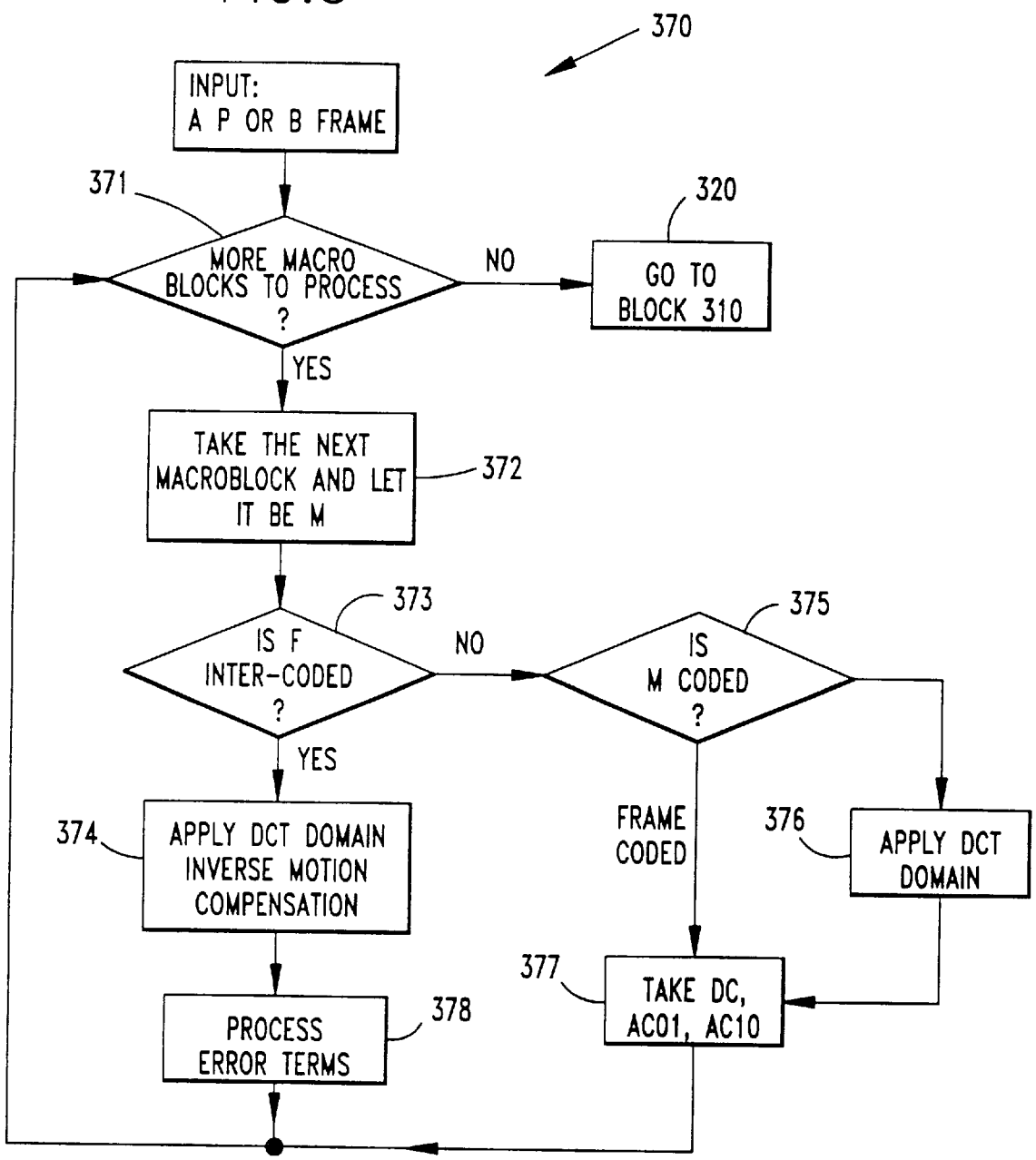
FIG. 5 is a flow chart showing the steps of constructing reduced image sequences from P and/or B frames.

FIG. 5 shows a flow chart which details the Step 370 in FIG. 3 and describes the steps of constructing reduced image sequences from P or B frames. Here again the DC, AC10, and AC01 coefficients are identified for frame coded macroblocks. However, for the motion compensated macroblocks in P and B frame format, the macroblock must be a converted to intracoded and frame coded macroblocks.

Step 371 determines if the current frame has more macroblocks to process. If not, the process continues at Step 320 in FIG. 3. If there are more macroblocks to process, the next macroblock is taken as the current macroblock (named as F) in Step 372. Step 373 tests if the current macroblock F is inter-coded. If not, step 375 tests if the current macroblock M is frame-DCT coded or field-DCT coded. If frame-DCT coded, M is directly processed by Step 377. If field-DCT coded, DCT domain deinterlacing as described by equations (9), (11), (12), (13) and (14)–(16) are applied to M in Step 376 and the deinterlaced macroblock is processed in Step 377. In Step 377, DC, AC01, and AC10 values are taken from the current macroblock M, and the process continues in Step 371. Note that blocks 375, 376, and 377 are identical to blocks 363, 364, and 365, and their descriptions, respectively. If the current macroblock is inter-coded in Block 373, DCT domain inverse motion compensation below is applied to M in Block 374. After step 375, the error term is computed and added to each DCT coefficients generated from step 375 in step 378 and process continues in Block 371. This computation of the error terms can be done in the same way that I frames were processed in FIG. 4.

Figure 6:
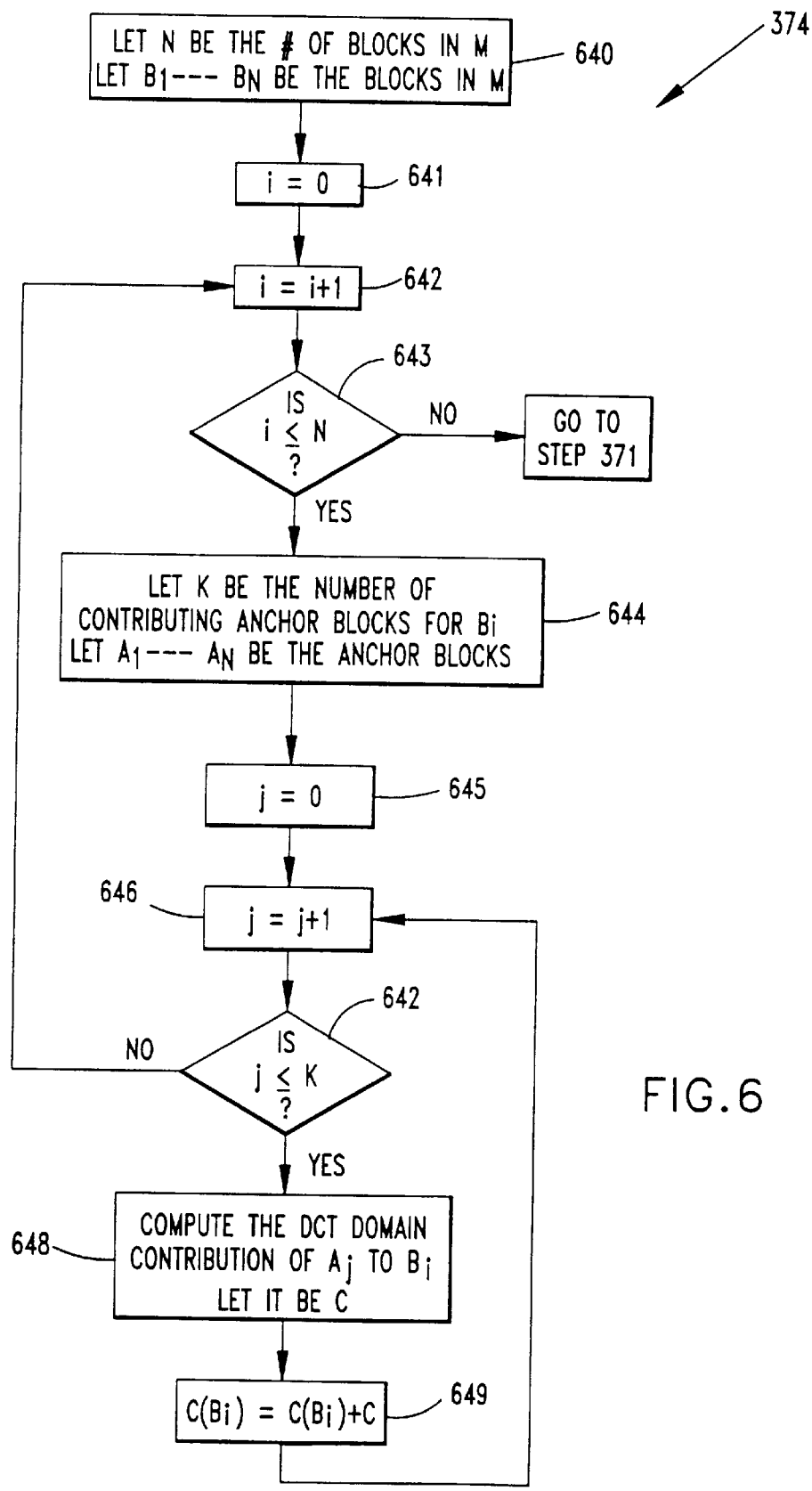
FIG. 6 is a flow chart showing the steps of applying DCT domain inverse motion compensation.

FIG. 6 shows the block diagram which details 374 in FIG. 5 and describes a preferred embodiment for the steps of applying the DCT domain inverse motion compensation for converting the interceded macroblocks to intracoded frame coded macroblocks so that the DC, AC10, and AC01 coefficients can be identified.

In Step 640, the number of blocks in the current macroblock is set to N and each block is set to $B_1, B_2, \ldots, B_N$. In Step 641, an index variable i is set to 0. In Step 642, the index variable i is incremented by 1. Step 643, determines if the current value of the index variable i is less than equal to N. If not, the DCT domain inverse motion compensation is finished and process continues in Step 371 in FIG. 5. Otherwise, in Step 644, block $B_i$ is taken. We want to obtain the reduced image representation associated with $B_i$. In a more general sense, we want to obtain the intra-frame DCT coded representation of $B_i$, which is coded using inter-frame motion compensation. Based on the motion vector associated with block $B_i$, the number of contributing anchor blocks K is determined. Call the contributing anchor blocks $A_j$, where j=1, 2, ... K. In Step 645 to 647, the index j is initialized and used to compute the contribution of anchor block $A_j$ to the DCT representation of $B_i$. The contribution of the current anchor block $A_j$ is computed and denoted by C (step 648) and then added to $C(B_i)$ (step 649). The process continues iterates from Step 646. The resulting $C(B_i)$ then gives the DCT domain representation of block $B_i$ or the reduced image representation of block $B_i$, which is equivalent to the DC and low order AC coefficients of DCT domain values of block $B_i$.

Figure 1C:
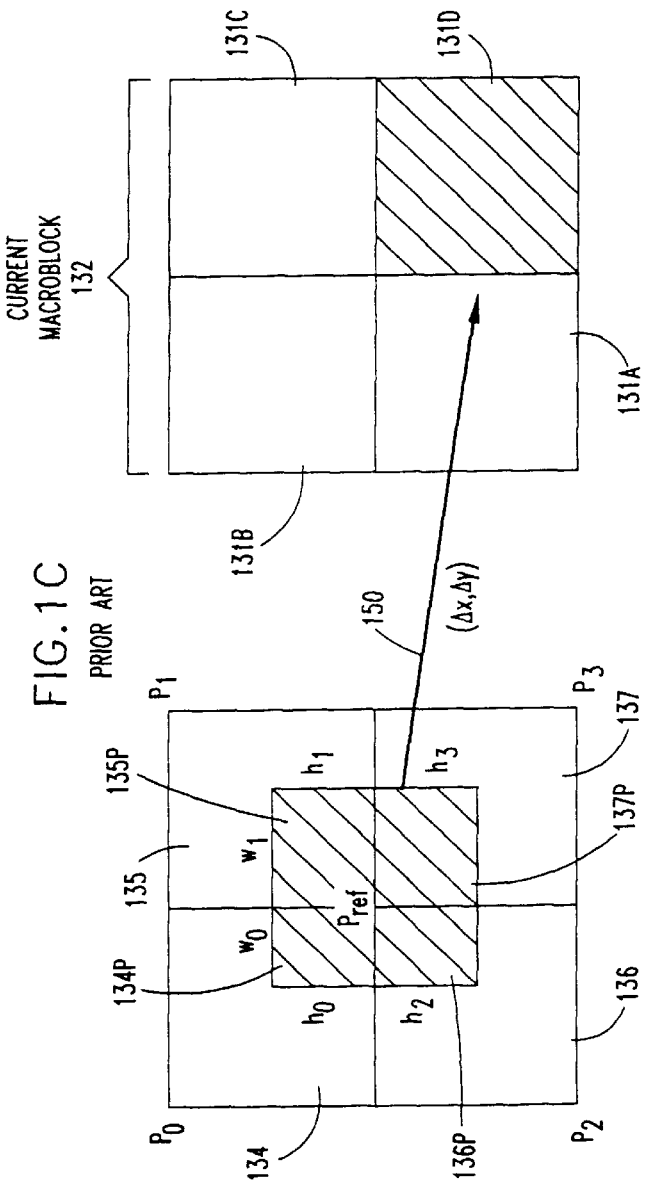
FIG. 1C is a drawing showing a prior art reference block, motion vectors, and original blocks in the MPEG-1 video standard.
Figure 1D:
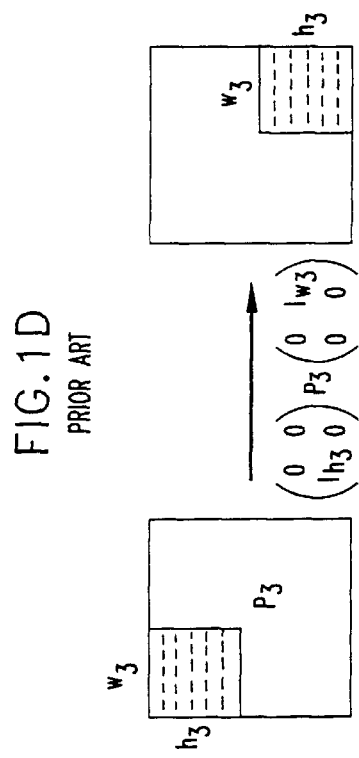
FIG. 1D is a drawing showing a representation of prior art matrix multiplications used to move MPEG-1 video contributing subblocks.
Figure 1E:
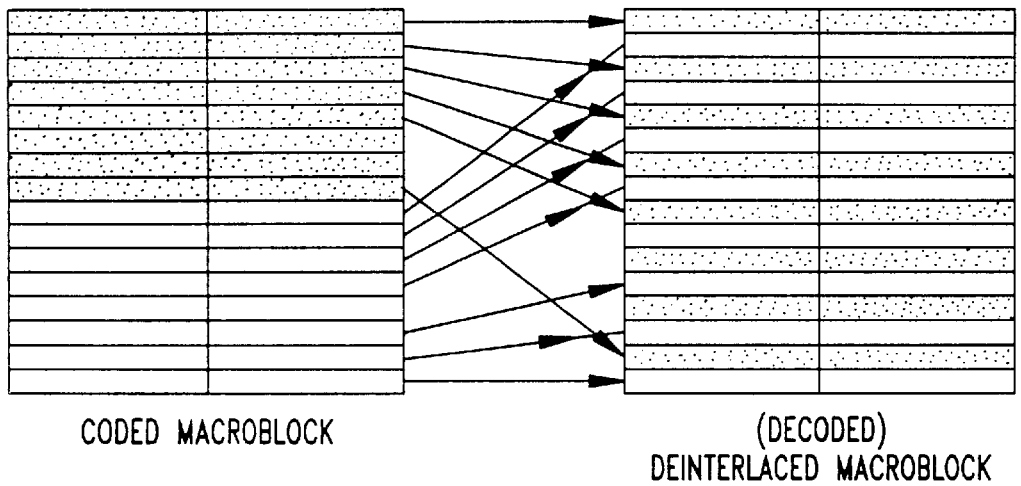
FIG. 1E is a drawing showing a representation of prior art field DCT coding in a frame picture in the MPEG-2 video standard.
Figure 1F:
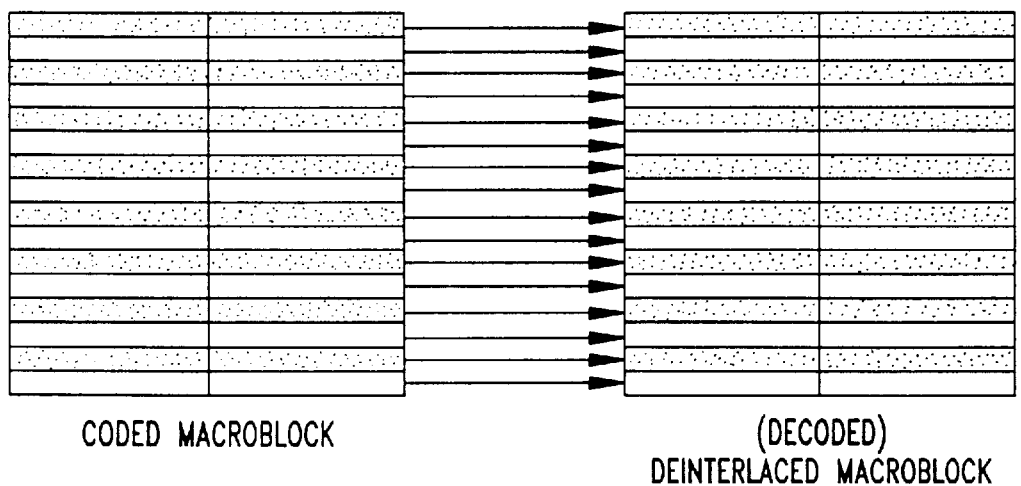
FIG. 1F is a drawing showing a representation of prior art frame DCT coding in a frame picture in the MPEG-2 video standard.
Figure 1G:
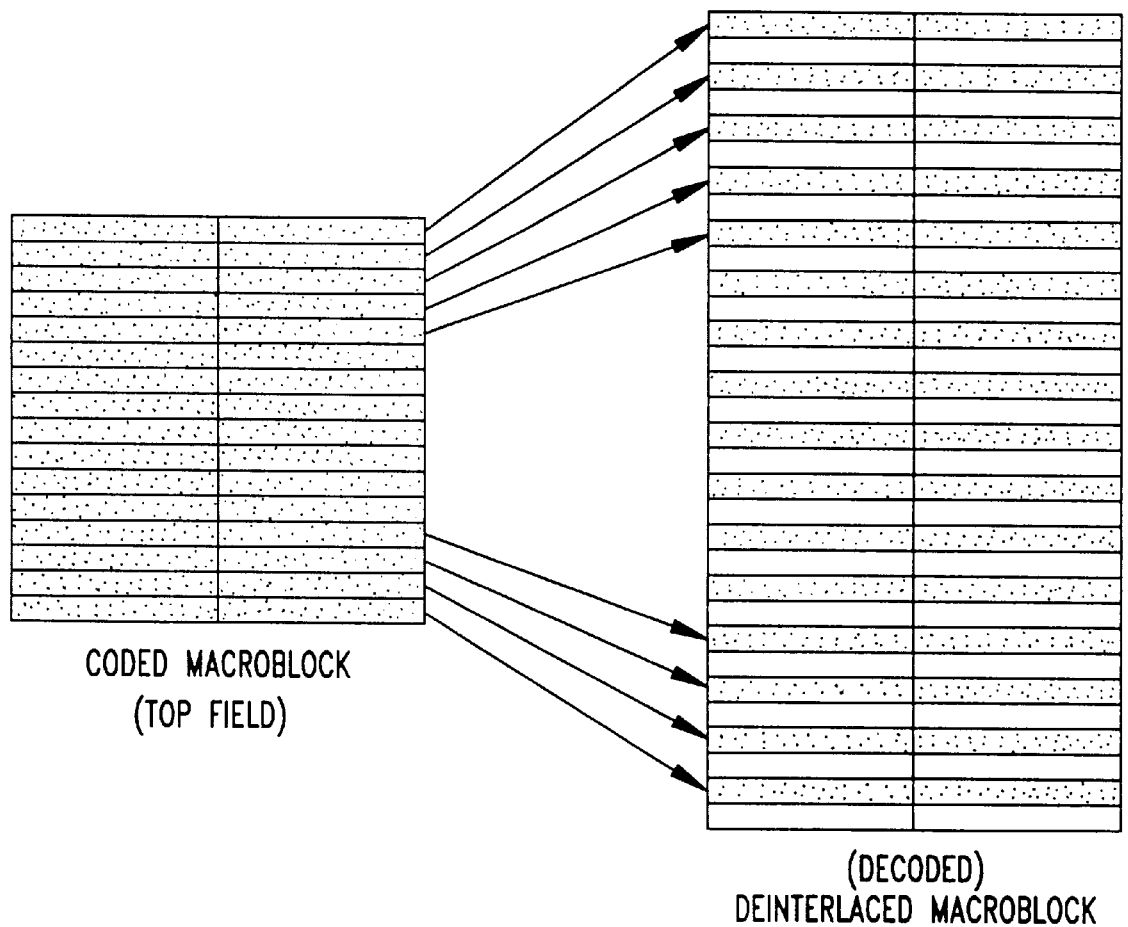
FIG. 1G is a drawing showing a representation of prior art a coded macroblock in a field picture in the MPEG-2 video standard.
Figure 1H:
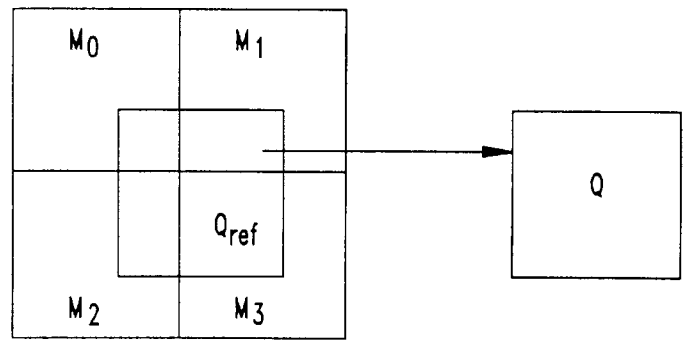
FIG. 1H is a drawing showing prior art frame prediction in a frame picture or prediction in a field picture in the MPEG-2 video standard.
Figure 1I:
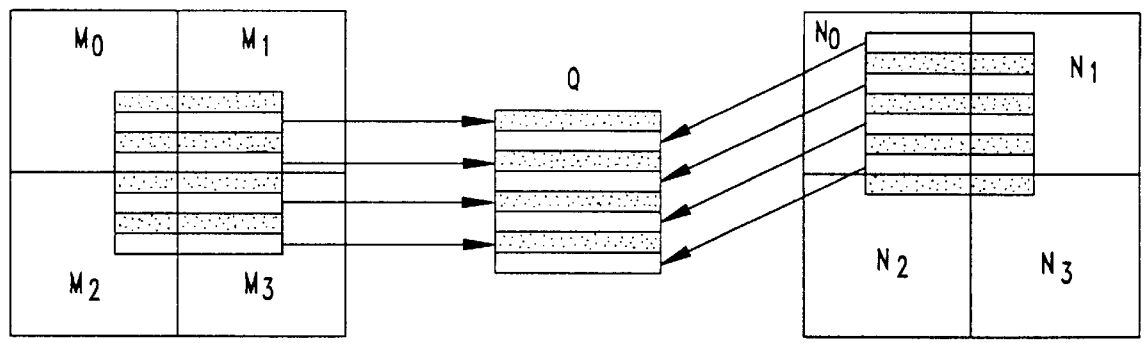
FIG. 1I is a drawing showing prior art field prediction in a frame picture in the MPEG-2 video standard.

Referring to FIGS. 1C and 1D it is noted that a current block 131 is created from portions 134P–137P of the respective anchor blocks 134–137 of the reference frame. Therefore, contribution of each of these portions 134P–137P to the current block 131 must be determined in order to create the current block 131. These contributions are weighted in a linear fashion to create the current block, the weights being determined by the modes of motion compensation (field or frame-based motion compensation), types of encoding of the anchor blocks (field or frame coded) and the motion vector(s). Note that while this is done in the prior art for MPEG-1, i.e., frame coded blocks and frame based motion compensation only, there is no apparatus or method disclosed or suggested in the prior art for determining these contributions for frame and/or field coded blocks in combination with frame and/or field based motion compensation, i.e., MPEG-2.

To determine the contribution of each portion 134P–137P of the respective blocks (134–137) to the current block 13 ID of the macroblock 132, the header of each macroblock 132 is used to determine if the macroblock 132 is generated by: 1. field based or 2. frame based motion compensation. Then it is determined if each of the respective blocks (134–137) is field or frame coded. Each of the following four cases are converted into an intracoded and frame coded DCT block:

a. the current block is generated from field based motion compensation and the contributing archor block (e.g. 134) is field coded.

b. the current block is generated from field based motion compensation and the contributing archor block (e.g. 134) is frame coded.
c. the current block is generated from frame based motion compensation and the contributing archor block (e.g. 134) is field coded.
d. the current block is generated from frame based motion compensation and the contributing archor block (e.g. 134) is frame coded.

For the details of how this is done see the description of FIG. 6A below which shows the details of step 648.

Figure 6A:
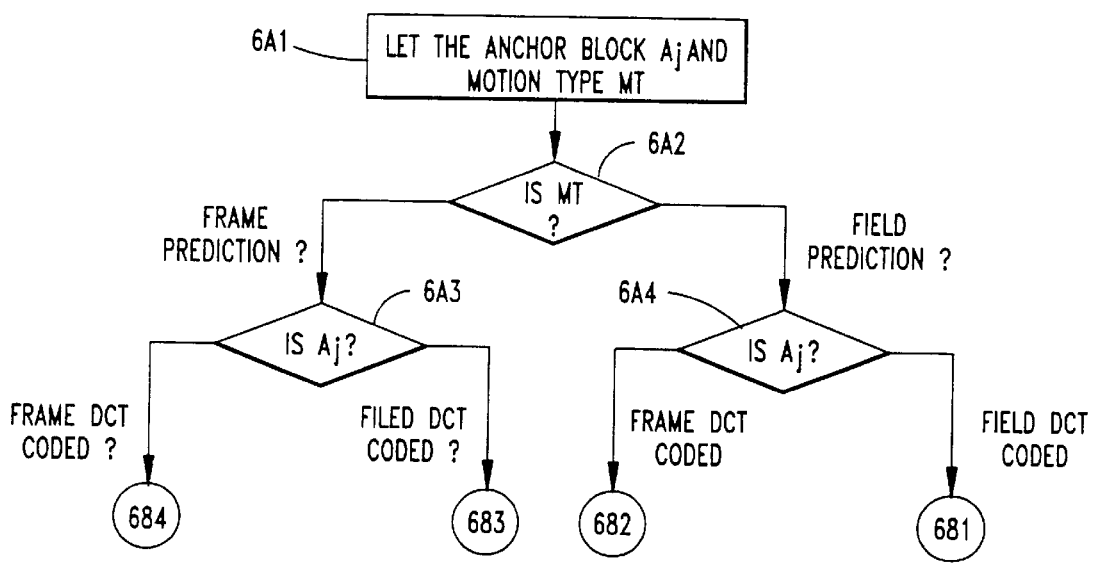
FIG. 6A is a flow chart showing the steps for computing contribution of each anchor blocks in the prediction of a block.

FIG. 6A is a flowchart showing the step used to compute the contribution of an anchor block, i.e., the details of step 648 of FIG. 6. In step 6A1, the anchor block is set to block $A_j$ and motion type is set to MT. In block 6A2, it is tested if the motion type MT is frame prediction or field prediction. If it is frame prediction, it is further tested if the block $A_j$ is frame coded or field coded. If it is frame coded, process goes to step 684 and if it is field coded, the process goes to 683. On the other hand, if motion type MT is field based prediction, it is tested in step 6A4, if the anchor block is frame coded or field coded. If frame coded, the process continues to 682 and if not to 681. The steps 681, 682, 683, and 684 handle the cases marked by a, b, c, and d in the above paragraph respectively.

One preferred method of computing the contribution of anchor blocks $A_j$, $j=1, 2, \ldots, K$ to current block of interest $B_i$ is now described. We have the DCT domain values of anchor blocks $A_j$ and we want to compute the DCT domain values of $B_i$. Furthermore, motion vector informations are used. We will describe the construction of the entire set of DCT coefficients of $B_i$ and also the DC coefficient of the frame coded version of $B_i$ (i.e., for generating DC images).

In the following description, we call the current block which is to be constructed Q and the anchor blocks by $M_i$ or $N_i$, where $0 \leq i \leq 3$ for the ease of notation. We first consider the steps 681 and 682 (corresponding cases a and b) in which the motion compensation is field based prediction.

Figure 7:
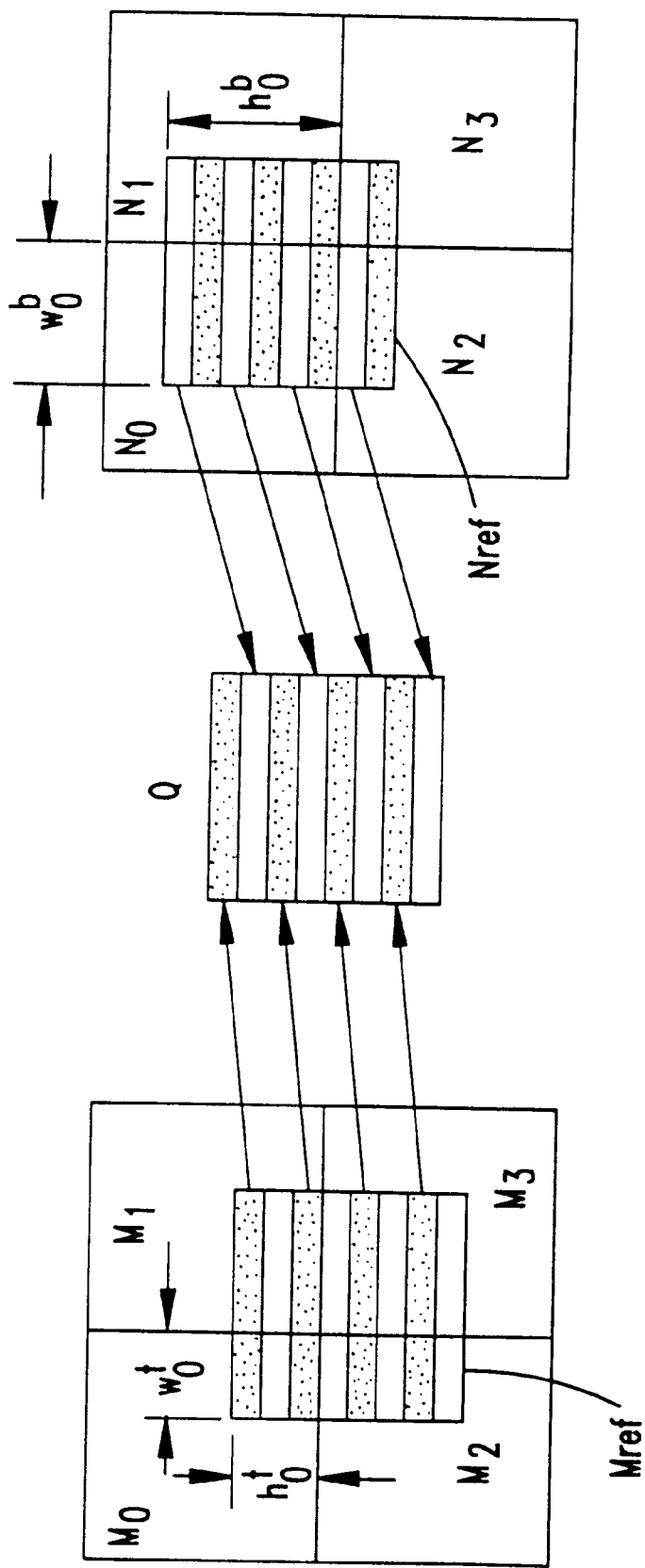
FIG. 7 is a block diagram showing field prediction.

(1) Field-based Prediction of Target Block: step 681 and 682, i.e., cases a and b In a field-based MC, two motion vectors are used to predict the top and bottom field of a macroblock. Field-based MC in the spatial domain is illustrated in FIG. 7. The goal here is to construct the DCT domain representation of the 8×8 block Q from the DCT domain representation of anchor blocks $M_i$, $N_i$ and motion vectors $(w_0^t, h_0^t)$ and $(w_0^b, h_0^b)$. Note that the anchor blocks can either be coded in interlaced or noninterlaced formats. We now describe details of the preferred embodiment.

In FIG. 7, the top field of the target block Q, 710 is predicted from four anchor 8×8 blocks $M_0, M_1, M_2, M_3$ and the bottom field 720 is predicted from another set of four 8×8 anchor blocks $N_0, N_1, N_2, N_3$. Without loss of generality, we assume the motion vector for generating the top and bottom fields of Q are $(w_0^t, h_0^t)$ and $(w_0^b, h_0^b)$ respectively. Note that in FIG. 7, the anchor blocks and the target block are non-interlaced spatial domain blocks. However, in DCT domain, these anchor blocks can belong to different anchor macroblocks, which can be coded in different format, i.e., either frame or field coded. The prediction of block Q 720 in spatial domain can be described by:

$$Q = \sum_{i=0}^{3} Q^{M_i} + \sum_{i=0}^{3} Q^{N_i} \qquad (17)$$

$$Q^{M_i} = P_i^t S_{i1}^t M_i S_{i2}^t \text{ and } Q^{N_i} = P_i^b S_{i1}^b N_i S_{i2}^b. \qquad (18)$$

$M_i$ and $N_i$ represent the anchor blocks in either interlaced or non-interlaced format. For each anchor block $M_i$ or $N_i$, $Q^{M_i}$ or $Q^{N_i}$ denotes the contribution of $M_i$ or $N_i$ to the prediction of the target Q and is computed by $P_i^t S_{i1}^t M_i S_{i2}^t$ or $P_i^b S_{i1}^b N_i S_{i2}^t$, where $P_i^t$, $P_i^b$, $S_{ij}^t$, and $S_{ij}^b$, $0 \leq i \leq 3$ and $1 \leq j \leq 2$, are matrices which we will describe below. The target block Q is formed by the summation of the contribution from each anchor block.

The DCT domain representation of Q is given by $$\hat{Q} = \sum_{i=0}^{3} DCT(\mathcal{P}_i^t S_{i1}^t) \hat{M}_i \hat{S}_{i2}^b + \sum_{i=0}^{3} DCT(\mathcal{P}_i^b S_{i1}^t) \hat{N}_i \hat{S}_{i2}^b \qquad (19)$$

To compute the contributions $Q^{M_i}$ or $Q^{N_i}$, $0 \leq i \leq 3$, three steps are involved. First, from each anchor block $M_i$ or $N_i$, the sub-block which contributes to the prediction of Q, called contributing sub-block, hereinafter, is identified. Second, the identified contributing sub-block is shifted vertically and horizontally to the appropriate corner. This is done by multiplying the matrices $S_{ij}^t$ and $S_{ij}^b$, $0 \leq i \leq 3$ and $1 \leq j \leq 2$. Third, each row of the shifted contributing sub-block is put to the correct row position corresponding to Q by multiplying the matrices $P_t^i$ and $P_b^i$. The matrices $S_{ij}^t$, $S_{ij}^b$, $P_i^t$, and $P_i^b$ are decided depending on the representation of $M_i$ and $N_i$.

We now considers two separate cases for the anchor blocks: (i) anchor non-interlaced and (ii) anchor interlaced.

(i) Anchor Noninterlaced: step 681 i.e., for case a

When $M_i$ ($N_i$) represents a non-interlaced block, we write $M_i = M_i$ ($N_i = N_i$). In this case, we want to compute the contribution of $M_i$, which is coded in non-interlaced formats in the DCT domain, to Q. The mode of motion compensation is however, still, field-based motion compensation.

We first shift the contributing sub-block of $M_i(N_i)$ and construct the contributing block after appropriate field selection (in this case, the top (bottom) field following FIG. 7). FIG. 8 illustrates the procedure to construct $Q^{M_2}$.

The sub-block is simply identified from the horizontal and vertical displacement $(w_i^t, h_i^t)$ or $(w_i^b, h_i^b)$. The location of the sub-block within the anchor block and its horizontal and vertical sizes decide the amount and direction of shifting in the same way as in MPEG-1. Therefore, the matrices for shifting in DCT domain motion prediction for MPEG-1, denoted by $S_{ij}$ (from Table 1), are used for $S_{ij}^t$ and $S_{ij}^t$, i.e., $$S_{ij}^t = S_{ij}(h_i^t, w_i^t) \qquad (20)$$

$$S_{ij}^b = S_{ij}(h_i^b, w_i^b) \qquad (21)$$

In FIG. 8, the contributing sub-block is a $h_i^t \times w_i^t$ block in the upper right corner of the anchor block $M_2$ and is shifted to the lower left corner in the contributing block $Q^{M_2}$.

The field selection in the contributing block is different for the top field prediction versus the bottom field prediction. In the top field prediction, every odd row is selected. However, in the bottom field selection, the selected odd rows are mapped to the even rows, i.e., $$\mathcal{P}_i^t = P_{sel}, \mathcal{P}_i^b = P_{swap} P_{sel}, \qquad (22)$$

-continued $$P_{sel} = \begin{pmatrix} 1 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & 0 & 0 \\ 0 & 0 & 0 & 0 & 0 & 0 & 0 & 0 \\ 0 & 0 & 0 & 0 & 1 & 0 & 0 & 0 \\ 0 & 0 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 0 \end{pmatrix} \text{ and}$$

$$P_{swap} = \begin{pmatrix} 0 & 1 & 0 & 0 & 0 & 0 & 0 & 0 \\ 1 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 0 & 0 & 0 & 0 & 1 & 0 & 0 \\ 0 & 0 & 0 & 0 & 1 & 0 & 0 & 0 \\ 0 & 0 & 0 & 0 & 0 & 0 & 0 & 1 \\ 0 & 0 & 0 & 0 & 0 & 0 & 1 & 0 \end{pmatrix}$$

TABLE 2

Selection of $S_{i1}{}^t$, $S_{i1}{}^b$, $S_{i2}{}^t$, and $S_{i2}{}^b$ for vertical and horizontal shifting when an anchor block is interlaced: $h' = h_i{}^t$ or $h' = h_i{}^b$, $w' = w_i{}^t$ or $w' = w_i{}^b$, and $0_4$ a 4 × 4 null matrix.

| Anchor block | $S_{i1}{}^t$ ($S_{i1}{}^b$) | | $S_{i2}{}^t$ ($S_{i2}{}^b$) |
|---|---|---|---|
| | $S_{i1}{}^u$ | $S_{i1}{}^l$ | |
| $M_0$ ($N_0$) / $M_1$ ($N_1$) | $\begin{pmatrix} 0 & I_{\lceil h'/2 \rceil} & 0_4 \\ 0 & 0 & \\ 0_4 & 0_4 & \end{pmatrix}$ | $\begin{pmatrix} 0_4 & 0 & I_{\lceil h'/2 \rceil} \\ & 0 & 0 \\ 0_4 & 0_4 & \end{pmatrix}$ | $S_{02}(\omega')$ / $S_{12}(\omega')$ |
| $M_2$ ($N_2$) / $M_3$ ($N_3$) | $\begin{pmatrix} 0 & 0 & \\ I_{\lfloor h'/2 \rfloor} & 0 & 0_4 \\ 0_4 & 0_4 & \end{pmatrix}$ | $\begin{pmatrix} 0_4 & 0 & 0 \\ & I_{\lfloor h'/2 \rfloor} & 0 \\ 0_4 & 0_4 & \end{pmatrix}$ | $S_{22}(\omega')$ / $S_{32}(\omega')$ |

(ii) Anchor Interlaced: step 682 i.e., handling case b

When $M_i$ ($N_i$) represents an interlaced block, $M_i$ ($N_i$)=$D'_3$, in some interlaced macroblock D', D'=

$$\begin{pmatrix} D'_0 & D'_1 \\ D'_2 & D'_3 \end{pmatrix}.$$

In this case, we want to compute the contribution of $M_i$, which is coded in interlaced formats in the DCT domain, to Q. The mode of motion compensation is still field-based motion compensation.

Given an interlaced 8×8 block, call the upper half of the block (i.e., the first four rows) the upper region and the lower half of the block (i.e., the last four rows) the lower region. Then, the contributing sub-block of each interlaced anchor block belongs to either the upper region or the lower region. Within each region, the contributing sub-block is displaced by $(w_i{}^t, \lceil h_i{}^t/2 \rceil)$ or $(w_i{}^b, \lceil h_i{}^b/2 \rceil)$ for $M_i$ and for $N_i$, when i=0, 1 and displaced by $(w_i{}^t, \lfloor h_i{}^t/2 \rfloor)$ or $(w_i{}^b, \lfloor h_i{}^b/2 \rfloor)$ for $M_i$ and for $N_i$, when i=2, 3.

FIG. 9 illustrates a scenario of field-based MC and field-coded anchor block $M_2$. In FIG. 9, the motion vector 150 is $(h_2{}^t, w_2{}^t)$ and it is desired that the contributing sub-block in $M_2$ contributes to the top field of Q. In FIG. 9(a), the contributing sub-block comes from the upper region while in 9(b), the contributing sub-block comes from the lower region.

The direction and amount of horizontal shifting is decided by $w_i{}^t$ or $w_i{}^b$, in the same way as in the anchor non-interlaced case, i.e., $S_{i2}{}^t = S_{i2}(w_i{}^t)$ and $S_{i2}{}^b = S_{i2}(w_i{}^b)$. The vertical shifting, however, is different for each region because the blocks are coded in interlaced format. The choices of the matrices $S_{i1}{}^t$ and $S_{i1}{}^b$ for vertical shifting is shown in Table 2. When the contributing sub-block belongs to the upper region of an interlaced anchor block, $S_{i1}{}^u$ is selected for both $S_{i1}{}^t$ and $S_{i1}{}^b$ whereas $S_{i1}{}^l$ is selected when the sub-block belongs to lower region.

Thus shifted contributing sub-block in $S_{i1}{}^t M_i S_{i2}{}^t$ or $S_{i1}{}^b M_i S_{i2}{}^b$ is still interlaced. Therefore, each row of it needs to be mapped to the right row position to construct the non-interlaced contributing block, i.e., $Q^{M_i}$ or $Q^{N_i}$. This can be done by using the two component matrices $P_0$ and $P_1$ of the permutation matrix P used for DCT domain de-interlacing. For the top field prediction, each row of the subblock is expanded to every other rows starting from the first row of the target block using $P_0$, i.e., $P_i{}^t = P_0$, $0 \leq i \leq 3$. For the bottom field prediction, each row is expanded to every other rows starting from the second row of the target block using $P_1$, $P_i{}^b = P_1$, $0 \leq i \leq 3$.

(2) Frame-Based Prediction of Target Block Q: steps 683 and 684 for cases c and d In a frame prediction, a motion vector is used to predict both top and bottom field of a target block. The prediction of a spatial domain block can be generally described by:

$$Q = \sum_i Q^{M_i}. \tag{23}$$

If an anchor block $M_i$ is non-interlaced, it contributes both to the top and bottom fields of the target block. The contribution can be written as:

$$Q^{M_i} = S_{i1} M_i S_{i2},$$

where $S_{ij}$, for i=0, 1, 2, 3 and j=1, 2, are the matrices for shifting contributing sub-blocks previously described. When the anchor block $M_i$ is interlaced, $M_i$ contributes either to the top field and the bottom field of the target block and there could be more than four anchor blocks. In this case, the contribution $Q^{M_i}$ can be computed as in field based prediction (anchor interlaced case), i.e., $$Q^{M_i} = P_i{}^t S_{i1}{}^t M_i S_{i2}{}^t \text{ or} \tag{24}$$

$$Q^{M_i} = P_i{}^b S_{i1}{}^b M_i S_{i2}{}^b. \tag{25}$$

Computing Select DCT Coefficients for Reduced Image Generation

To generate reduced images like the DC or DC+2AC images from inter-coded P and B frames, only select DCT coefficients of $Q\hat{S}_{ij}{}^t$, $\hat{S}_{ij}{}^b$, $\hat{P}_i{}^t$, and $\hat{P}_i{}^b$, $0 \leq i \leq 3$ and $1 \leq j \leq 2$, can be precomputed. The contribution of each anchor block to each component in $\hat{Q}$ can be written as follows a weighted linear combinations of the DCT coefficients of the contributing anchor blocks as follows:

$$(Q^{\hat{M}_i})_{kl} = \sum_{m=0}^{7} \sum_{n=0}^{7} DCT(\mathcal{P}_i S_{i1})_{km} (\hat{M}_i)_{mn} (\hat{S}_{i2})_{nl} \tag{26}$$

$$= \sum_{m=0}^{7} \sum_{n=0}^{7} w_{kl}(i, m, n)(\hat{M}_i)_{mn} \tag{27}$$

where the weights $$w_{kl}(i,m,n) = DCT(P_i S_{i1})_{km} (\hat{S}_{i2})_{nl} \quad (28)$$

depends on (a) the mode of motion compensation (field-based or frame-based), (b) the mode of encoding of the contributing anchor blocks (field or frame coded), and (c) the motion vectors. Then, $$(\hat{Q})_{kl} = \sum_i (Q^{\hat{M}_i})_{kl} \quad (29)$$

From Equation (27), the prediction of a component DCT value of a contributing block requires 64 multiplications resulting in a maximum of 64×8 multiplications for the prediction of a target block, since there a maximum of 8 possible contributing anchor blocks.

In addition, we will need to construct the DC and select AC values of the target block, which could potentially be used as future anchor blocks. Unlike MPEG-1, blocks in B frame could be used as anchor block (field-based motion compensation for prediction of the other field). This means that we need to maintain the DC and select AC values of most predicted blocks in P and B frames.

Fast computation of the weighted linear combination of equation (27) can be achieved by using only select set of coefficients in equation (28). One preferred embodiment is to use restrict the computation of equation (27) to $0 \leq m+n \leq 1$, i.e., only use the DC, AC01 and AC10 coefficients of the intra-coded anchor blocks. We call this the DC+2AC approximation. In the DC+2AC approximation, equation (27) becomes:

$$DCT(Q)_{kl} = \sum_i DCT(Q^{M_i})_{kl} \quad (30)$$

$$\approx \sum_i \sum_{m+n \leq 1} w_{kl}(i, m, n)(\hat{M}_i)_{mn}, \quad (31)$$

where $w_{kl}(i, m, n)$ is defined in equation (28). Of particular interest is the retention of only $DCT(Q)_{00}$, $DCT(Q)_{01}$ and $DCT(Q)_{10}$.

Fast Algorithms

The following describes one preferred embodiment of the above invention. This is claimed in U.S. patent application Ser. No. 08/873,490 entitled "SYSTEM AND METHOD FOR DCT DOMAIN INVERSE MOTION COMPENSATION USING SHARED INFORMATION" of Song and Yeo, which was filed on the same day as this application and is herein incorporated by reference.

We will now describe preferred algorithms for fast DCT domain inverse motion compensation and fast extraction of spatially reduced images based on shared information. More rigorously, we will describe preferred algorithms for fast evaluation of equations (18) and (31). The speedup is based on two classes of methods: (i) neighboring anchoring blocks with the same coding format, and (ii) the use of shared information across anchor blocks in the same macroblock.

A common theme in the speedup is to re-order the movement of contributing subblocks in the inverse motion compensation process such that permutation matrices are involved. The use of permutation matrices will allow maximal exploitation of neighboring anchor blocks with same coding format and use of shared information across anchor blocks in the same macroblock. We will first describe how permutation matrices allow speedup in the reconstruction of spatially reduced images, i.e., the speedup in the evaluation of equation (31) using neighboring anchoring blocks with the same coding formations and shared information across anchor blocks in the same macroblocks.

First, a preferred embodiment of approximate computation of DC, AC01 and AC10 coefficients of the form DCT(ABC), where A, B and C are 8×8 matrices, is as follows:

$$DC\widetilde{T(ABC)}_{kl} = \sum_{m+n \leq 1} v_{kl}(m, n) \hat{B}_{mn}, \quad (32)$$

where $v_{kl}(m, n) = \hat{A}_{km} \hat{C}_{nl}$, and $0 \leq k+l \leq 1$. When either A and/or C is a permutation matrix P, we obtain matrix P, we obtain $$DC\widetilde{T(PBA)}_{kl} = \sum_{m+n \leq 1} v^0_{kl}(m, n)(\hat{B})_{mn}, \quad v^0_{kl}(m, n) = \hat{P}_{km} \hat{A}_{nl} \quad (33)$$

$$DC\widetilde{T(ABP)}_{kl} = \sum_{m+n \leq 1} v^1_{kl}(m, n)(\hat{B})_{mn}, \quad v^1_{kl}(m, n) = \hat{A}_{km} \hat{P}_{nl} \quad (34)$$

$$DC\widetilde{T(PAP')}_{kl} = \sum_{m+n \leq 1} v^2_{kl}(m, n)(\hat{B})_{mn}, \quad v^2_{kl}(m, n) = \hat{P}_{km} \hat{P'}_{nl}, \quad (35)$$

where $k+l \leq 1$ and $m+n \leq 1$. Table 3, Table 4, and Table 5 show the values of 9 coefficients used in the approximation, i.e., $v_{kl}^0(m, n)$ (Table 3), $v_{kl}^1(m, n)$ (Table 4), and $v_{kl}^2(m, n)$ (Table 5), for each (k, l) and (m, n) pairs. Table 3 and Table 4 state that three values (DC, AC01, and AC10) of $DC\widetilde{T(PBA)}$ or $DC\widetilde{T(ABP)}$ can be computed with 5 multiplications, saving 4 multiplications over the general case, as four entries are zero. Similarly, Table 5 states that three values of $DC\widetilde{T(PBP')}$ can be computed only with 2 multiplications as one entry is a 1 and 6 entries are 0s.

When vertically or horizontally neighboring anchor blocks have the same coding format, the equations for DCT domain inverse motion compensation can be rearranged so that they include permutation matrices and thereby the computational cost for the same computation can be reduced as suggested by Table 3, 4 and 5. To proceed, we note that the matrices for horizontal shifting $S_{i2}$ have the following properties:

$$S_{02}(w_0) = S_{22}(w_2), S_{12}(w_1) = S_{32}(w_3), \quad (36)$$

$$S_{02}(w_0) + S_{12}(w_1) = P^0 = \begin{pmatrix} 0 & I_{8-w_0} \\ I_{w_0} & 0 \end{pmatrix}, \quad (37)$$

TABLE 3

$\hat{P}_{km}\hat{A}_{nl}$ - Pre-multiplication
by a permutation matrix: 5 multiplications

| (k, l)\(m, n) | (0, 0) | (0,1) | (1, 0) |
|---|---|---|---|
| (0, 0) |   |   | 0 |
| (0, 1) |   |   | 0 |
| (1, 0) | 0 |   | 0 |

TABLE 4

$\hat{A}_{km}\hat{P}_{nl}$ - Post-multiplication
by a permutation matrix: 5 multiplications

| (k, l)\(m, n) | (0, 0) | (0,1 ) | (1, 0) |
|---|---|---|---|
| (0, 0) |   | 0 |   |
| (0, 1) | 0 |   |   |
| (1, 0) |   | 0 | 0 |

TABLE 5

$\hat{P}_{km}\hat{P}^1_{nl}$ - Pre- and Post-multiplication
by a permutation matrices: 2 multiplications

| (k, l)\(m, n) | (0, 0) | (0,1 ) | (1, 0) |
|---|---|---|---|
| (0, 0) | 1 | 0 | 0 |
| (0, 1) | 0 |   | 0 |
| (1, 0) | 0 | 0 |   | and $P^0$ is a 8×8 permutation matrix.

We now proceed to describe the preferred embodiment of rewriting equation (31) to take advantage of equations (36) and (37), and the speedup as suggested by Table 3, 4 and 5. Neighboring Anchor Blocks with the Same Coding Format There are two cases: (i) two neighboring anchor blocks with the same coding format and (ii) all four neighboring anchor blocks with the same coding format.

(i) Two Neighboring Anchor Blocks with the Same Coding Format

Suppose that two upper anchor blocks $M_0$ and $M_1$ belong to macroblocks coded in the same format. In this case, regardless of coding format or motion prediction mode, $$S_{01}=S_{11}, P_0=P_1. \quad (38)$$

Using these relationships, a preferred way of writing the prediction of $Q^{M_0}+Q^{M_1}$ is:

$$Q^{M_0}+Q^{M_1}=P_0S_{01}M_0S_{02}+P_1S_{11}M_1S_{12} \quad (39)$$

$$=P_0S_{01}(M_0-M_1)S_{02}+P_0S_{01}M_1P^0 \quad (40)$$

In the second term of equation (40), there is a post-multiplication by a permutation matrix. While the DC+2AC approximation to the first term in equation (40) requires 9 multiplications, a preferred method of computing the DC+2AC approximation to the second term can be done with 5 multiplications, from Table 4. Compared to equation (39), three extra additions are needed to compute $\hat{M}_0-\hat{M}_1$. However, as four terms are zero (from Table 4), four additions can also be saved, resulting in saving 4 multiplication and 1 addition operation. This preferred embodiment computes the contribution of $Q^{M_0}+Q^{M_1}$ together in a single step versus computing the contribution in two separate steps (i.e., computing $Q^{M_0}$ and $Q^{M_1}$ independently). The gain comes from expressing $Q^{M_0}+Q^{M_1}$ in terms of a permutation matrix and thus the reduction of number of multiplications as suggested by Table 4.

Likewise, when the two bottom anchor blocks $M_2$ and $M_3$ are coded in the same format, the equation for the prediction of $Q^{M_2}+Q^{M_3}$ can be rewritten in a similar fashion saving the same amount of computation. In this case, the fact that $S_{21}=S_{31}$ and $P_2=P_3$ will be used.

When vertically neighboring anchor blocks are coded with the same formats, similar saving can be obtained. However, the reduction in the computation depends on the prediction mode and coding formats of the anchor blocks. For example, when the two anchor blocks $M_0$ and $M_2$ are coded in the same format, we have $P_0=P_2$, and $$Q^{M_0}+Q^{M_2}=P_0S_{01}M_0S_{02}+P_2S_{21}M_2S_{22}$$

$$=P_0S_{01}(M_0-M_2)S_{02}+P_0XM_2S_{02}, \quad (41)$$

where $X=S_{01}+S_{21}$. Note in the case of frame-based MC and non-interlaced anchor blocks, $P_0=I$ and $X$ is a permutation matrix, resulting in the same saving as in the horizontally neighboring case. In general, if we have interlaced anchor blocks, $X$ will not be a permutation matrix.

(ii) All Four Anchor Blocks with the Same Coding Format

When all four anchor blocks are coded in the same format, a preferred way of expressing Q is $$Q = \sum_{i=0}^{3} Q^{M_i} \quad (42)$$

$$= \frac{z_1}{\mathcal{P}_0 S_{01}(M_0 - M_1 - M_2 + M_3)S_{02}} + \frac{z_2}{\mathcal{P}_0 S_{01}(M_1 - M_3)P^0} +$$

$$\frac{z_3}{\mathcal{P}_0 X(M_2 - M_3)S_{02}} + \frac{z_4}{\mathcal{P}_0 X M_3 P^0}$$

In equation (42), two terms include the permutation matrix $P^0$. Therefore, the DC+2AC approximation of Q can be computed with 28 (=9+9+5+5) multiplications. It also requires 9 extra addition operations to compute $R_1=M_1-\hat{M}_3$, $R_2=\hat{M}_2-\hat{M}_3$, and $\hat{M}_0-R_1-R_2$; 8 additions are saved by zero coefficients. It saves 8 multiplication operations and requires 1 more addition operation. In the case of frame-based MC and non-interlaced anchors, $P_0X$ is also a permutation matrix. In this case, the number of multiplications is reduced to 21 (=9+5+5+2), saving 15 multiplication an also 5 addition operations. We also label the terms in equation (42) as $Z_1$, $Z_2$, $Z_3$ and $Z_4$. They will be referred to later in equation (47), equation (48) and equation (49), and also FIGS. 16 to 23 for fast method to perform the DCT domain inverse motion compensation of 4 blocks within the same macroblock.

Macroblock Based Prediction: Reusing Intermediate Computation

In many cases, a set of neighboring target blocks are predicted using the same motion vector. For example, four 8×8 luminance data blocks (or chrominance data blocks in CHROMA 444) within a macroblock share the same motion vector in both the field and frame prediction. In CHROMA 422, two vertically neighboring blocks of chrominance share the same motion vector. In such cases, the same anchor block can be shared across the multiple target blocks. This means that there are possibly shared information in the predictions of multiple target blocks. For the description that follows, we will describe the preferred embodiment for computing the DCT inverse motion compensation of a 16×16 macroblock consisting of four 8×8 blocks by taking into account shared information among the blocks and demonstrate the speedup obtained. Other similar cases can be deduced.

Figure 10:
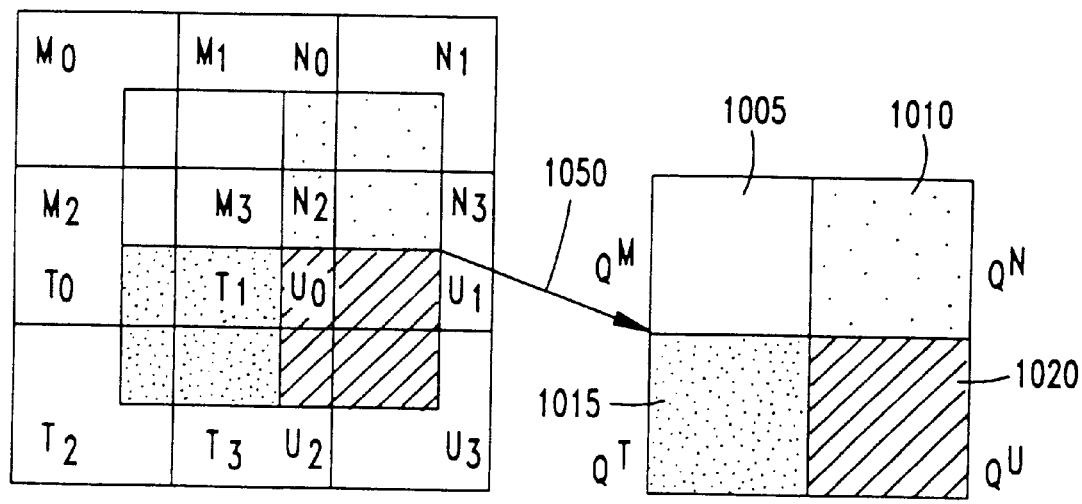
FIG. 10 is block diagram showing the predication of a 16×16 macroblock.

FIG. 10 shows the prediction of a 16×16 macroblock Q. Each of the four 8×8 target blocks $Q^M$ 1005, $Q^N$ 1010, $Q^T$ 1015, and $Q^U$ 1020 is predicted from four anchor blocks, $M_i$, $N_i$, $T_i$, and $U_i$, i=0, 1, 2, 3, respectively. For the prediction of each target block (1005, 1010, 1015, 1020), the DCT domain values of the four contributing anchor blocks need to be computed and added. However, note that the predictions of four target blocks are strongly correlated to each other and do not have to be computed independently. Consider the following two observations.

First, although there are totally 16 contributing anchor blocks, there are only 9 different anchor blocks and 5 of them are shared among multiple target blocks, since the target blocks belong to the same macroblock and are predicted using the same motion vector 1050. For example, the target blocks $Q^M$ 1005 and $Q^N$ 1010 share two anchor blocks, i.e., $M_i=N_0$ and $M_3=N_2$. Similarly, $Q^M$ 1005 and $Q^T$ 1015 share $M_2=T_0$ and $M_3=T_1$, etc. Second, the vertical and horizontal displacements of each contributing sub-block within the anchor block are identical across the four target blocks, $Q^M$ 1005, $Q^N$ 1010, $Q^T$ 1015, and $Q^U$ 1020. That is, $w^{M_i}=w^{N_i}=w^{T_i}=w^{U_i}$ and $h^{M_i}=h^{N_i}h^{T_i}=h^{U_i}$ for $0 \leq i \leq 3$, where w's and h's superscribed by the anchor block (such as $w^{M_i}$ $h^{M_i}$) denote the horizontal and vertical displacements caused by the motion vectors associated with each anchor block.

(i) Computation of Contribution of Two Neighboring Regions

Figure 11:
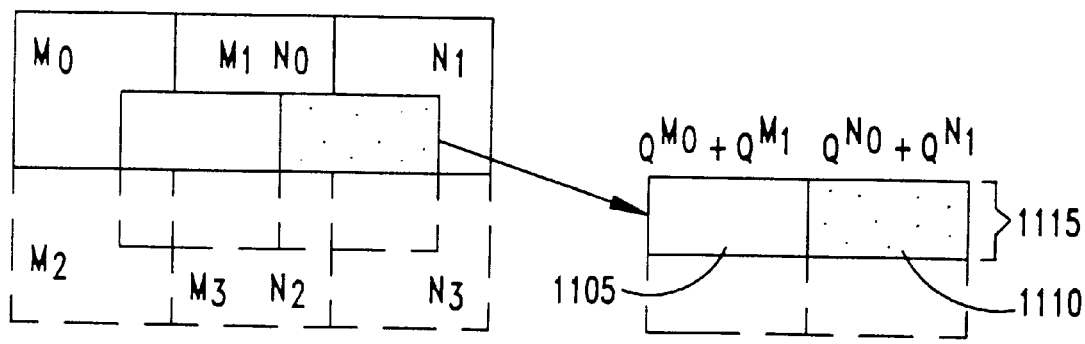
FIG. 11 is a block diagram showing prediction of two horizontally neighboring regions.

We first consider the prediction of upper regions 1115 of two horizontally neighboring target blocks $Q^M$ 1005 and $Q^N$ 1010 as shown in FIGS. 10 and 11, when the respective anchor blocks have the same coding formats. From FIG. 12 onward, we will only illustrate the movement and additions of contributing sub-blocks assuming they are coded in non-interlaced formats, i.e., for each movement of contributing sub-blocks described generically by $P_0YLZ$, where Y is of the form $S_{i1}$ or X, L is either an anchor block (e.g., $M_0$) or a combination of anchor blocks (e.g., $M_{0-M1}$), and Z is of the form $S_{i2}$ or $P^0$, we will ignore the effect of $P_0$ in the figure for simplicity. The situation when the contributing sub-blocks are coded in interlaced formats is similar.

Figure 12:
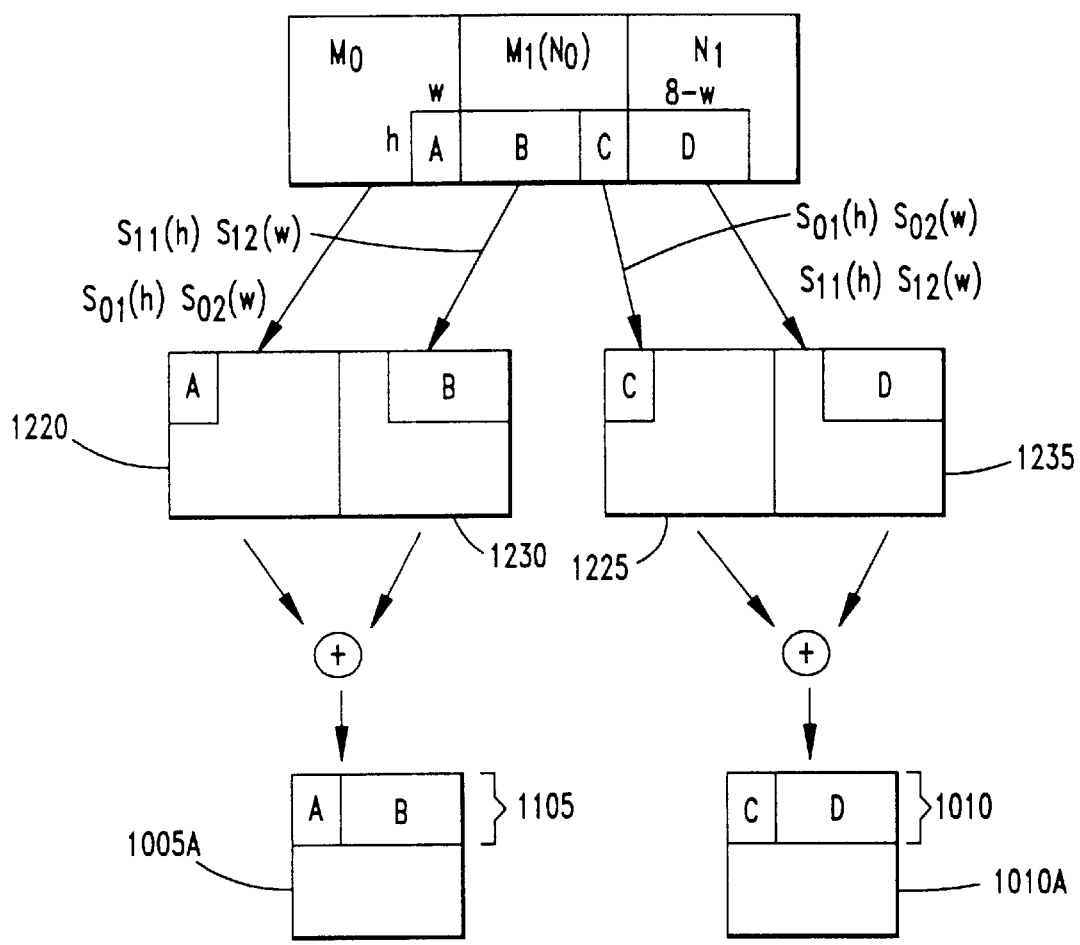
FIG. 12 is a block diagram showing the brute force computation of DCT domain inverse motion compensation of two adjacent blocks with same motion vectors.

The brute-force approach (prior art) is shown in FIG. 12. Each of the subblocks A, B, C and D are treated separately—in the DCT domain, A and C are moved from the lower right corner of $M_0$ and $M_1$ respectively to the upper left corners of intermediate blocks 1220 and 1225, and B and D are moved from the lower left corners of $M_1$ $(=N_0)$ and $N_1$ respectively to the upper right corners of intermediate blocks 1230 and 1235. The remaining coefficients of the intermediate blocks are set to zeros (the white space in intermediate blocks 1220, 1225, 1230 and 1235). The $S_{0,j}$ matrices used for pre and post multiplication to move the blocks are also shown in FIG. 12. After the movements, the intermediate blocks containing A and B are added together, and the blocks containing C and D are added together to yield the upper regions (1105 and 1110) of the intra-coded target blocks 1005A and 1010A. In this method, 4 pairs of matrix pre and post multiplications are needed.

Figure 13:
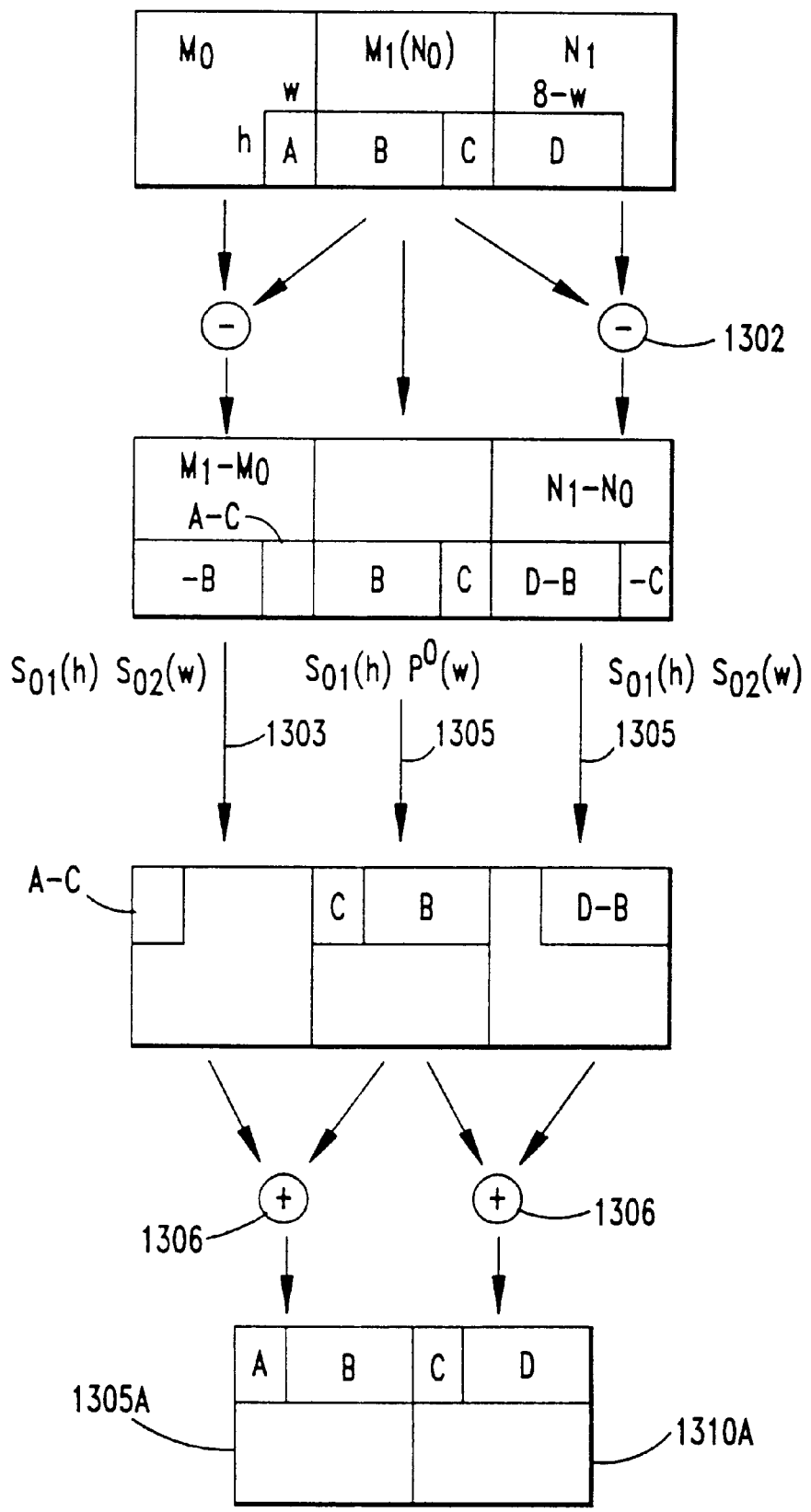
FIG. 13 is a block diagram showing a preferred method for fast DCT domain inverse motion compensation of two adjacent blocks with same motion vectors using shared information in the two blocks.
Figure 14:
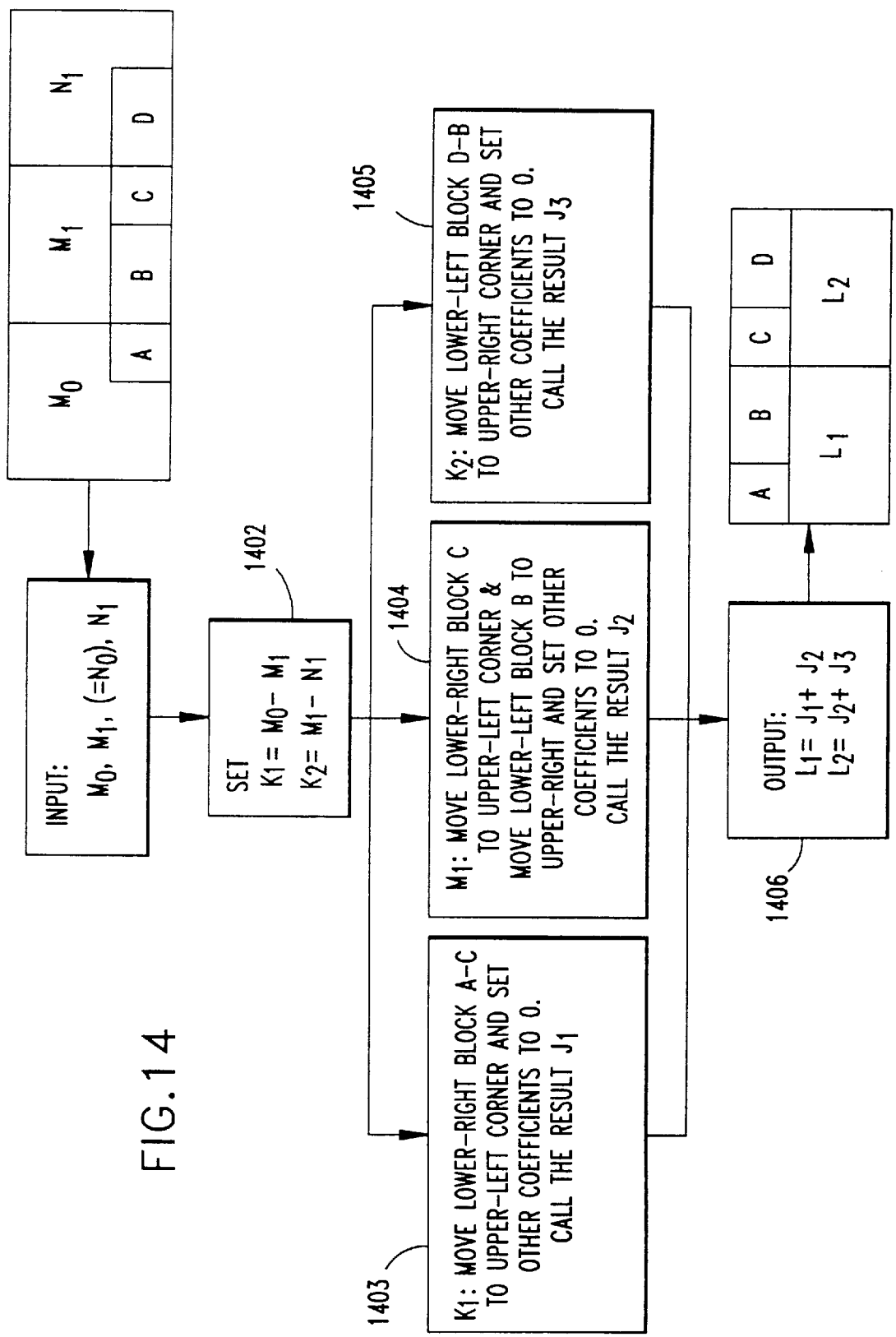
FIG. 14 is a flow chart for a preferred method for fast DCT domain inverse motion compensation using shared information across two adjacent blocks.

However, our invention shows a preferred embodiment for computing the contribution of the upper regions 1105 and 1110 of the target blocks takes into account the shared information (B and C) across the three contributing intra-coded anchor blocks $M_0$, $M_1$ $(=N_0)$ and $N_1$. The sharing of information as processed by the invention is illustrated in FIG. 13 and the flowchart of this process is shown in FIG. 14. In the preferred embodiment, instead of moving each of the subblocks A, B, C and D separately, each pair of adjacent intra-coded anchor blocks (the pair $M_0$, $M_1$ and the pair $M_1$, $N_1$) are first subtracted 1302 from each other (1402) as specified in FIG. 14. In 1403, the lower right subblock A–C resulting from the block subtraction in 1402 is moved to the upper left corner, and in 1404, the lower left subblock D–B resulting from the block subtraction in 1402 is moved to the upper right corner. The matrices for this movement are shown in FIG. 13 and are the same as the one used in FIG. 11. A key difference (1404) is to simultaneously move the subblock B at the lower left corner and C at the lower right corner to the upper right and upper left respectively. Such a move can be described by one pre and post multiplication: $S_{01}(h)M_1P^0(w)$, where $P^0(w)$ is defined in equation (37). The results are again added (1306,1406) to yield the results: $L_1$ (1305A) and $L_2$ (1310A). In the preferred embodiment, only 3 pairs of matrix pre and post multiplications are needed versus using 4 pairs in the brute-force approach of FIG. 12.

Rather than separating the shared information (i.e., contributing sub-blocks B and C) of the intra-coded shared anchor blocks into four intermediate blocks, as in the prior art, the invention accounts for the shared information (subblocks B and C) in each of the "non-shared" intra-coded anchor blocks. Then the positions of the contributing sub-blocks (B and C) are reversed in the intra-coded shared anchor block so that the addition of the respective pair of intermediate blocks results (1305A and 1310A) in the same upper regions (1105 and 1110 respectively) of the intra-coded target blocks (e.g., 1305A=1005A and 1310A=1010A). However, this is accomplished with 25% fewer matrix multiplications that move the sub-blocks (A, B, C and D). Further, only three intermediate blocks are used.

A more rigorous explanation of the flow chart in FIG. 14 follows. Note that equation (40) defines steps 1402, 1404 and 1406. We can rewrite equation (40) as $$Q^{M_0}+Q^{M_1}=P_0S_{01}(M_1-M_0)S_{12}+P_0S_{01}M_0P^0, \quad (43)$$

and thus write the corresponding equation for the target block $Q^N$ as:

$$Q^{N_0}+Q^{N_1}=P_0S_{01}(N_1-N_0)S_{12}+P_0S_{01}N_0P^0, \quad (44)$$

which defines steps 1402, 1404 and 1406. Note that the DCT domain value for the second term of equation (44), i.e., $\hat{P}_0 \hat{S}_{01} \hat{N}_0 \hat{P}^0$ has already been computed as $\hat{P}_0 \hat{S}_{01} \hat{M}_1 \hat{P}^0$ using equation (40). This is the shift 1404 and swap 1404 of the shared subblocks B and C. Only $\hat{P}_0\hat{S}_{01}(\hat{N}_1-\hat{N}_0)\hat{S}_{12}$ (pair subtraction and move) needs to be additionally computed to get $\hat{Q}^{N_0}+\hat{Q}^{N_1}$. Therefore, in the context of generating the DC+2AC approximation, 9 additional multiplications are needed. Since equation (43) needs 14 multiplications, a total of 23 (=14+9) multiplications are needed to construct the DC+2AC approximation of $\hat{Q}^{M_0}+\hat{Q}^{M_1}$ and $\hat{Q}^{N_0}+\hat{Q}^{N_1}$.

Given this disclosure, the same novel steps can be applied to any three adjacent (i.e., horizontally, vertically and diagonally adjacent intra-coded anchor blocks). More rigorously, the prediction of $\hat{Q}^{M_0}+\hat{Q}^{M_2}$ and $\hat{Q}^{T_0}+\hat{Q}^{T_2}$, $$Q^{M_0}+Q^{M_2}=P_0S_{01}M_0S_{02}+P_0S_{21}M_2S_{22}=P_0(S_{01}M_0+S_{21}M_2)S_{02}$$

$$=P_0(S_{01}M_0+(X-S_{01})M_2)S_{02}=P_0S_{01}(M_0-M_2)S_{02+P_0}XM_2S_{02} \quad (45)$$

Similarly $$Q^{T_0}+Q^{T_2}=P_0S_{21}(T_2-T_0)S_{02}+P_0XT_0S_{02}. \quad (46)$$

The second terms of the two equations are the same since $M_2=T_0$. Note that this is true, whether or not X is a permutation matrix. In this case the total number of multiplications to predict two regions is 27 (=9+9+9). In the frame prediction and anchor non-interlaced case, it becomes 23 (=9+5+9).

ii) Prediction of Two Neighboring Blocks

Here we will describe the use of the invention to convert two adjacent inter-coded target blocks (e.g., 1005 and 1010) to two adjacent intra-coded target blocks (1005A and 1010A) using three or more (e.g., 6) anchor blocks (here, $M_0$, $M_1$, $N_1$, $M_2$, $M_3$ and $N_3$).

Figure 15:
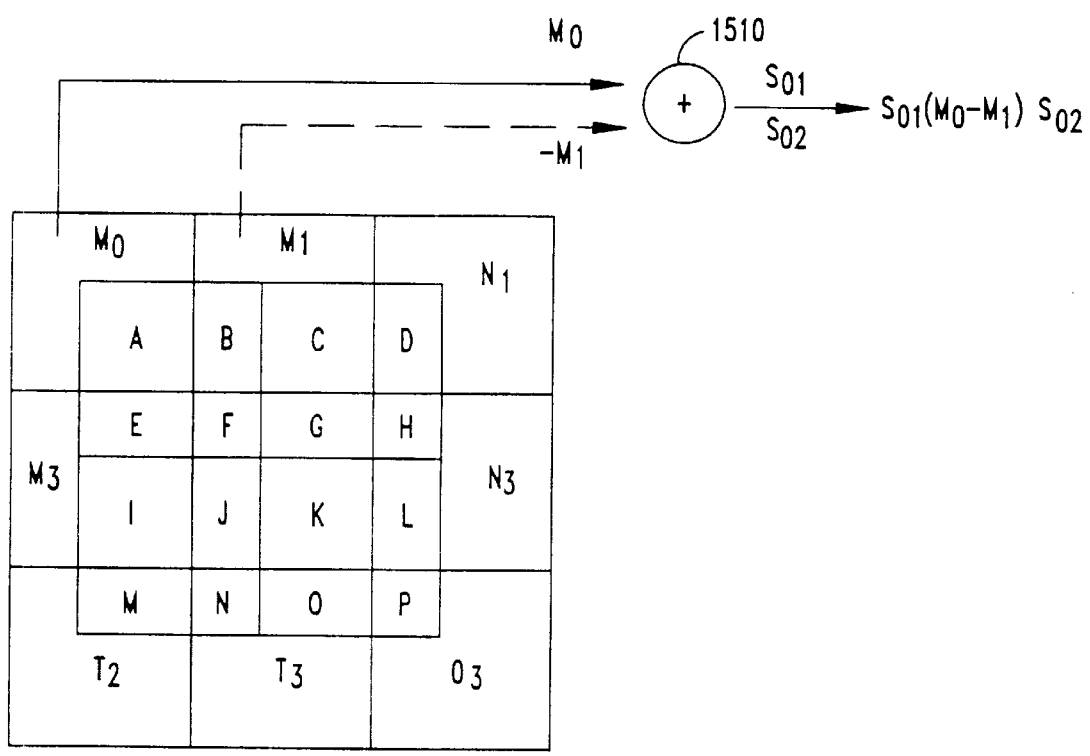
FIG. 15 is a labeling of contributing subblocks of FIG. 10 and notations for use in FIGS. 16 to 23.
Figure 16:
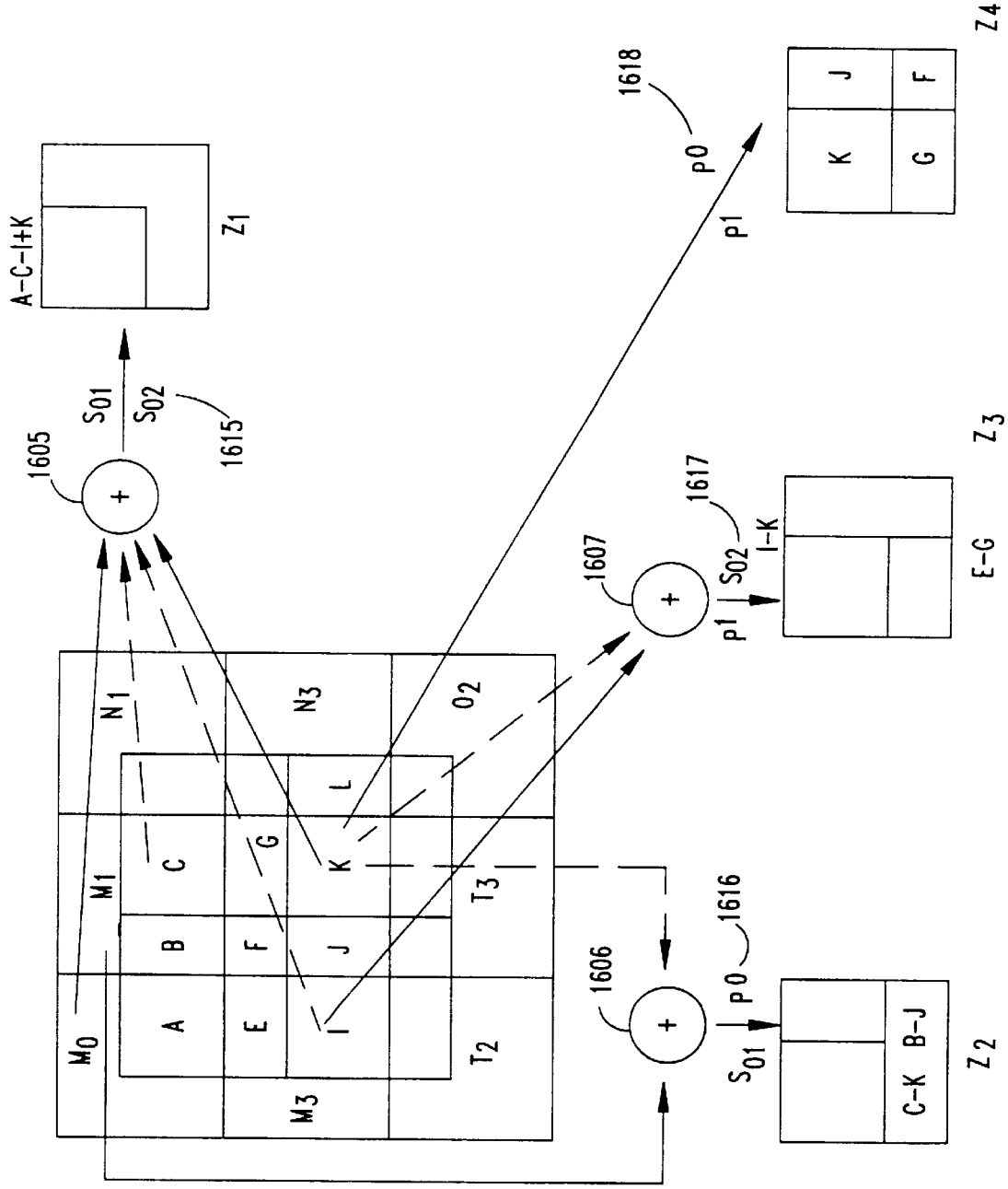
FIGS. 16 and 17 are block diagrams showing a preferred method for fast DCT domain inverse motion compensation of four adjacent blocks with same motion vectors using shared information in the four blocks to construct the block $Q^M$.

In FIG. 15, we first set up the notation for use in FIG. 16. It depicts the same setup of blocks as in FIG. 10 with contributing sub-blocks A–P as shown. Anchor blocks $M_0$ and $M_1$ are labeled and are combined 1510 as $M_0$–$M_1$. The notation is that a full arrow drawn from $M_0$ means that $M_0$ is taken without any modification, whereas a dashed arrow drawn from $M_1$ means that $M_1$ is taken as $-M_1$, i.e., the values in block $M_1$ are negated. As before, the effect of matrix pre and post multiplication to shift the summed blocks $M_0$–$M_1$ is described by the two matrices $S_{01}$ and $S_{02}$. FIG. 16 illustrates the effect of the anchor block combinations and movement as described in equation (42). The subblocks A, B, C, E, F, G, I, J and K contribute to the value of $Q^M$. The effect of block combination (1605–1607) and movements (1615–1618) results in the intermediate blocks $Z_1$, $Z_2$, $Z_3$ and $Z_4$, as labeled in FIG. 16 and equation (42). The combination and movement of subblock is similar to that described in FIG. 13. More specifically, the contributing subblocks A, C, I and K from the respective adjacent anchor blocks ($M_0$, $M_1$, $M_2$ and $M_3$) are combined 1605 and moved 1615 so that the intermediate block $Z_1$ contains shared information A-C-I+K that is shifted 1615 to the top left corner of intermediate block $Z_1$. The contributing subblocks B, C, J and K from the respective adjacent anchor blocks ($M_0$ and $M_3$) are combined 1606 and moved 1616 so that the intermediate block $Z_2$ contains shared information C-K that is shifted 1616 to top left corner and B-J shifted 1616 simultaneously to top right corner of $Z_2$. Similarly, the contributing subblocks E, G, I and K from the respective adjacent anchor blocks ($M_2$ and $M_3$) are combined 1607 and moved 1617 so that the intermediate block $Z_3$ contains shared information I-K that is shifted 1617 to top left corner and E-G shifted 1617 simultaneously to bottom left corner of $Z_3$. Lastly, The contributing subblocks G, F, K and J from anchor block $M_3$ are combined 1618 so that the intermediate block $Z_4$ contains the subblock G, F, K and J but shifted from left to right, and bottom to top from $M_3$ to $Z_4$.

Figure 17:
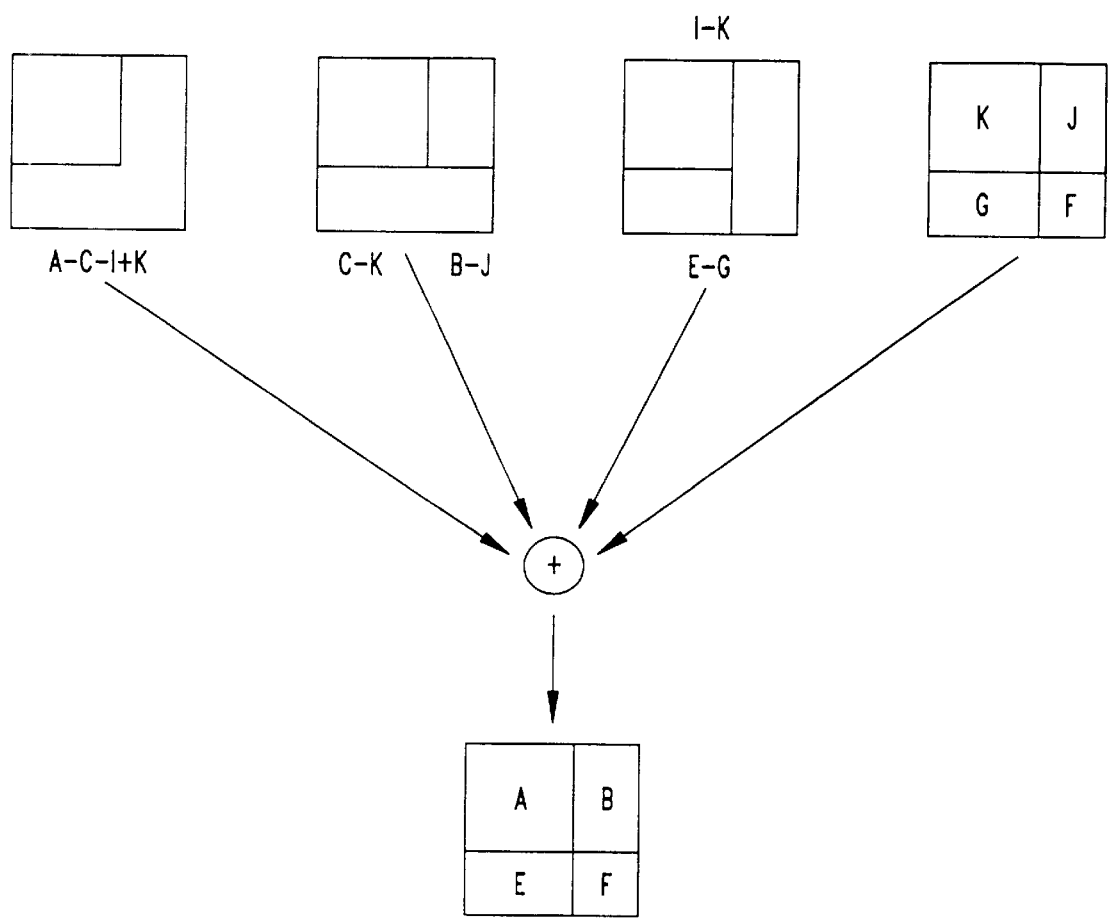
Figure 18:
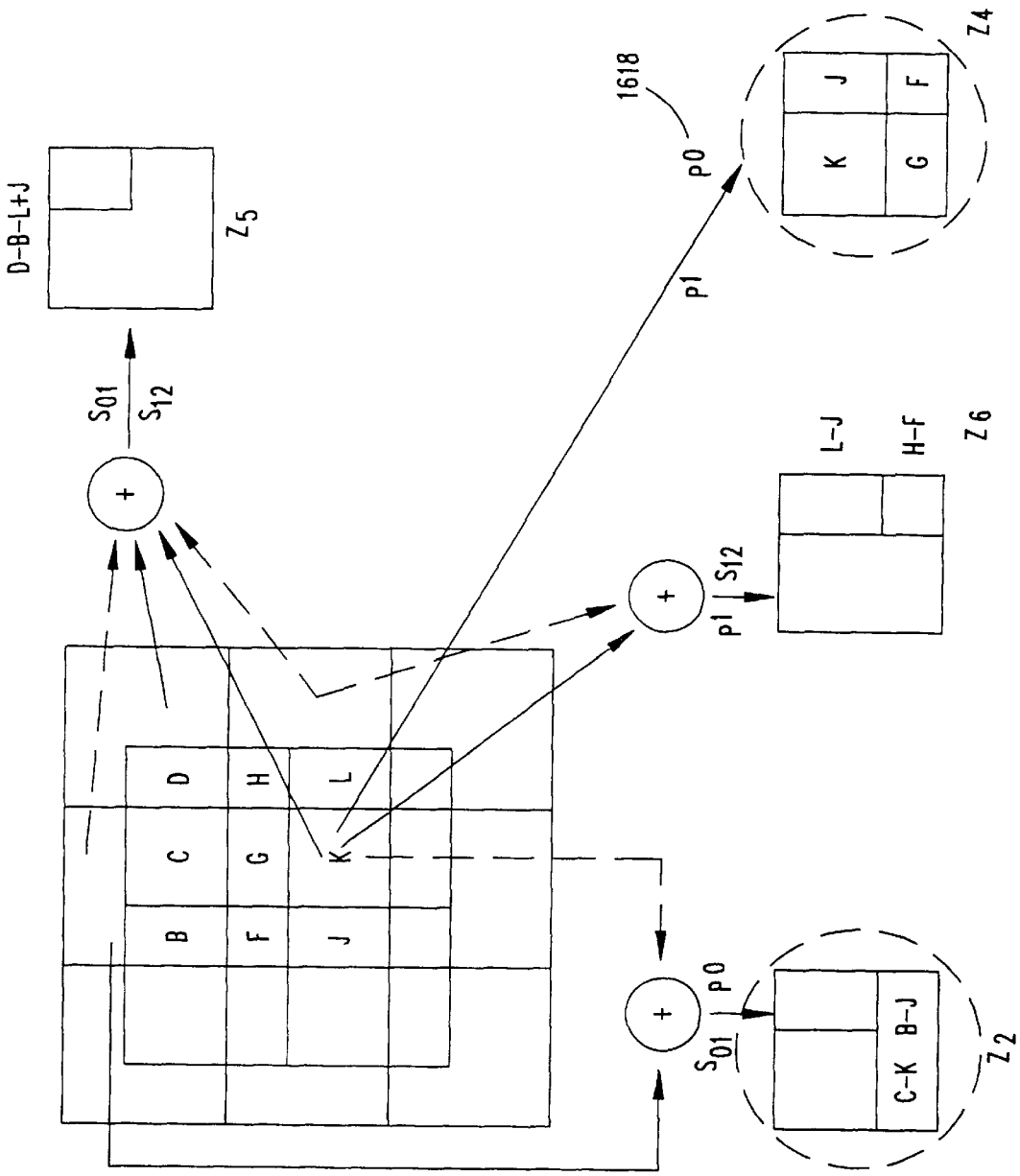
FIGS. 18 and 19 are block diagrams showing a preferred method for fast DCT domain inverse motion compensation of four adjacent blocks with same motion vectors using shared information in the four blocks to construct the block $Q^N$.
Figure 19:
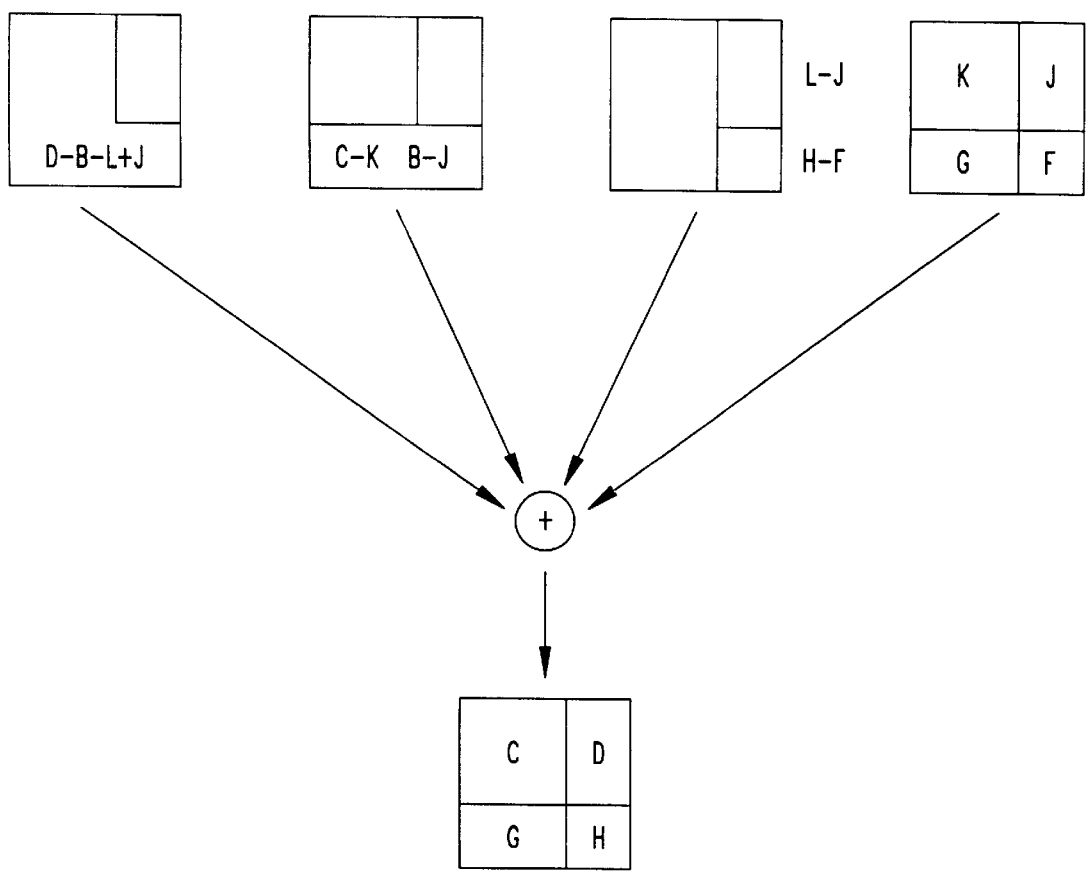

In FIG. 17, $Z_1$ through $Z_4$ are added together to yield $Q^M$. In FIG. 18, the combination and shifting of blocks to yield the adjacent target block $Q^N$ is shown. Here, the combination and movement of blocks are similar to those in FIG. 16. Furthermore, $Z_2$ and $Z_4$ can be reused from FIG. 16 and the two blocks are further marked with a circle. This form of sharing is again analogous to the one shown in FIG. 12. In FIG. 19, the results are added to obtain $Q^N$. From the combination and addition of subblocks in FIGS. 16 and 18 to yield the new intra-coded target blocks $Q^m$ 1005 and $Q^N$ 1010, only 6 pairs of pre and post matrix multiplications are needed as possible due to the use of shared information as opposed to 8 pairs of pre and post matrix multiplications if each of the contributing sub-blocks are treated separately.

A more rigorous explanation of FIGS. 16 through 19 is equation (42) and equation (47), which is shown below:

$$Q^N = \sum_{i=0}^{3} Q^{N_i} \quad (47)$$

$$= \overline{\mathcal{P}_0 S_{01}(N_1 - N_0 - N_3 + N_2)S_{12}} + \overline{\mathcal{P}_0 S_{01}(N_0 - N_2)P^0} +$$

$$\overline{\mathcal{P}_0 X(N_3 - N_2)S_{12}} + \overline{\mathcal{P}_0 X N_2 P^0}$$

The second ($Z_2$) and the fourth terms ($Z_4$) of equation (47) are the same as those of equation (42) and can be reused, since $N_0 = M_1$ and $N_2 = M_3$. Therefore, $Z_1 = \hat{P}_0 \hat{S}_{01}(\hat{N}_1 - \hat{N}_0 - \hat{N}_3 + \hat{N}_2)\hat{S}_{12}$ and $Z_3 = \hat{P}_0 \hat{X}(\hat{N}_3 - \hat{N}_2)\hat{S}_{12}$ corresponding to the first and the third terms need to be additionally computed. The sharing of information is analogous to that shown in FIG. 13 except that instead of considering only 2 subblocks in each block, this case involves all 4 subblocks. The total number of multiplications to construct the DC+2AC approximation of $\hat{Q}^M$ and $\hat{Q}^N$ becomes 46 (=9+5+9+5+9+9). For the frame prediction, it becomes 35 (=9+5+5+2+9+5).

(iii) Prediction of the Whole Macroblock

When all the anchor blocks are of the same formats for the four target blocks in a macroblock, we can apply similar ideas to save the computation. Assuming the intra-coded DCT representation of $Q^M$ 1005 and $Q^N$ 1010 have already been computed based on sharing as described by equation (42) and equation (47) and FIGS. 16 to 19, we can further use the shared information to compute $Q^T$ 1015 and $Q^U$ 1020.

Figure 20:
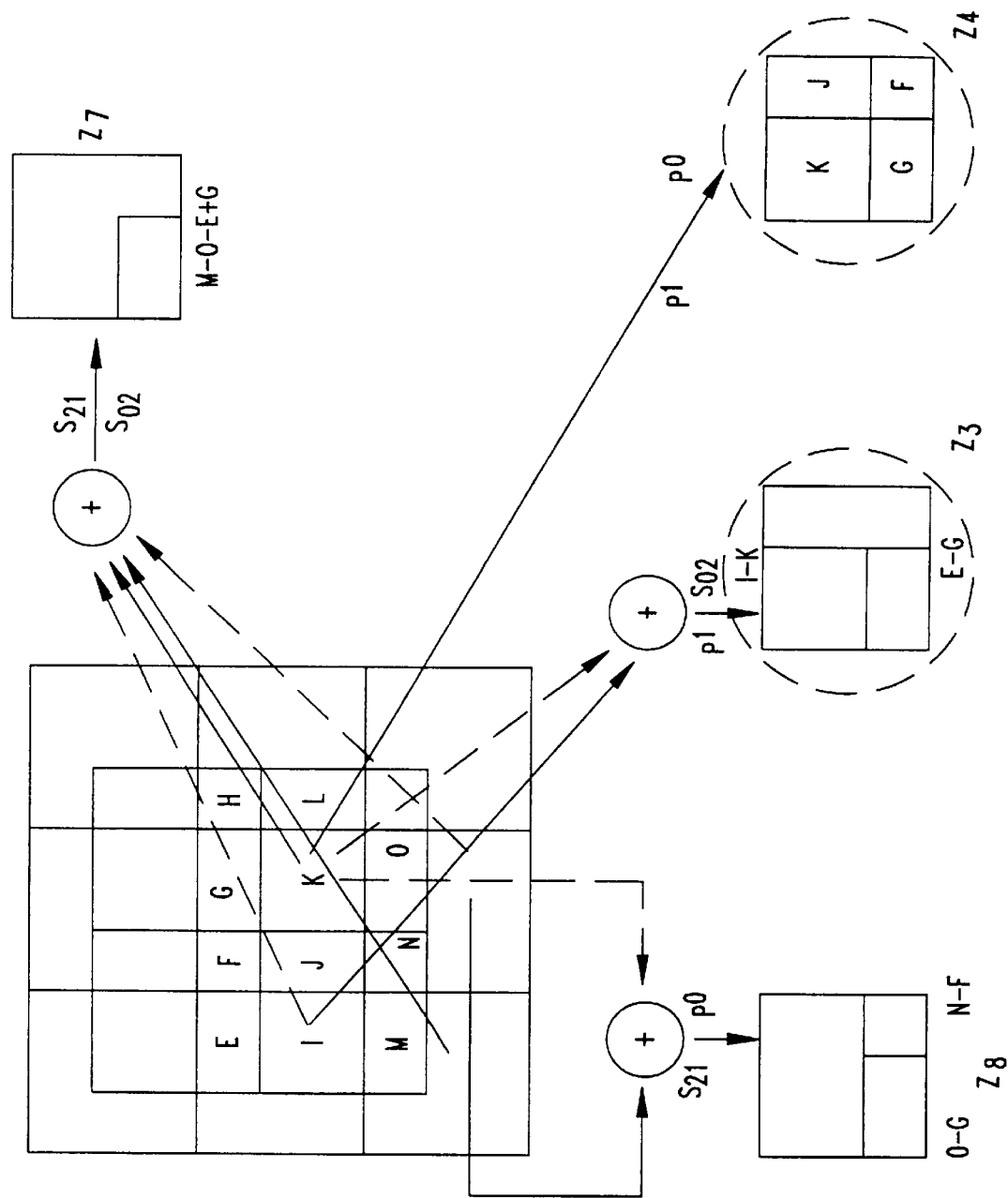
FIGS. 20 and 21 are block diagrams showing a preferred method for fast DCT domain inverse motion compensation of four adjacent blocks with same motion vectors using shared information in the four blocks to construct the block $Q^T$.
Figure 21:
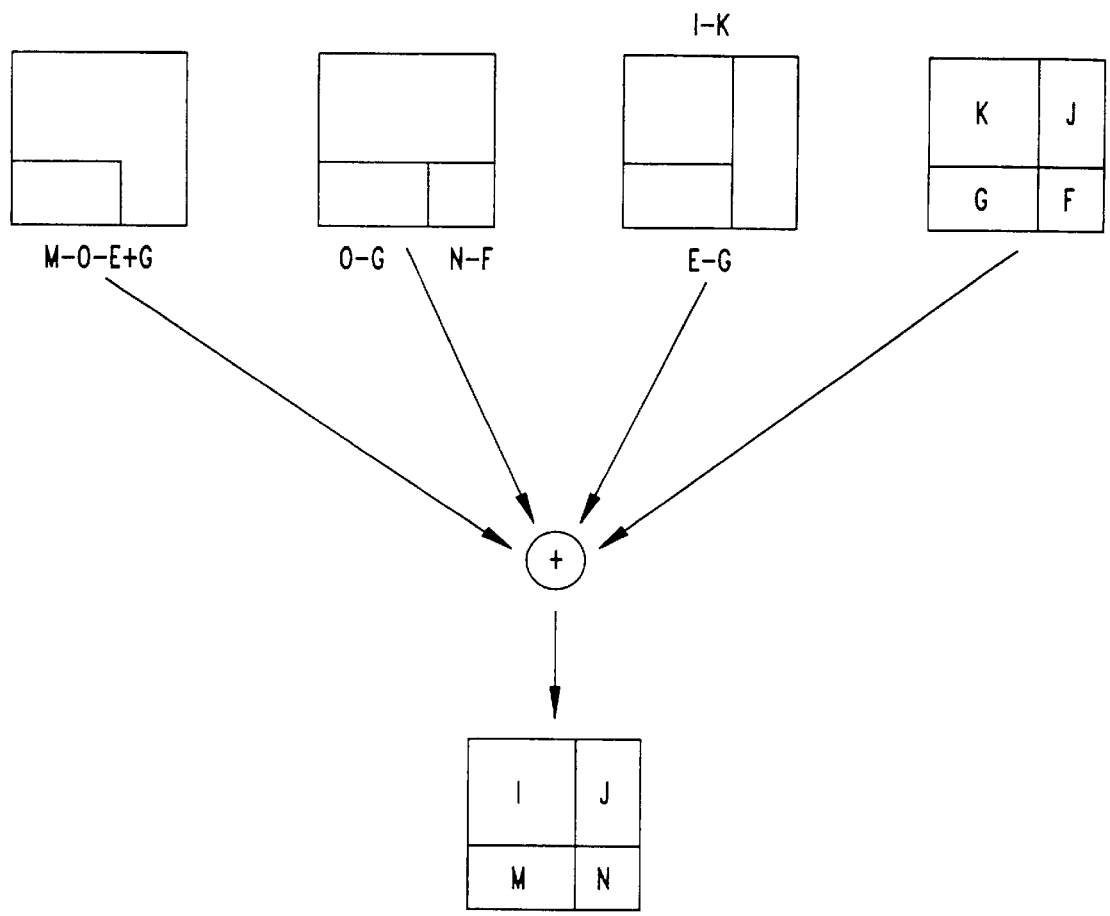
Figure 22:
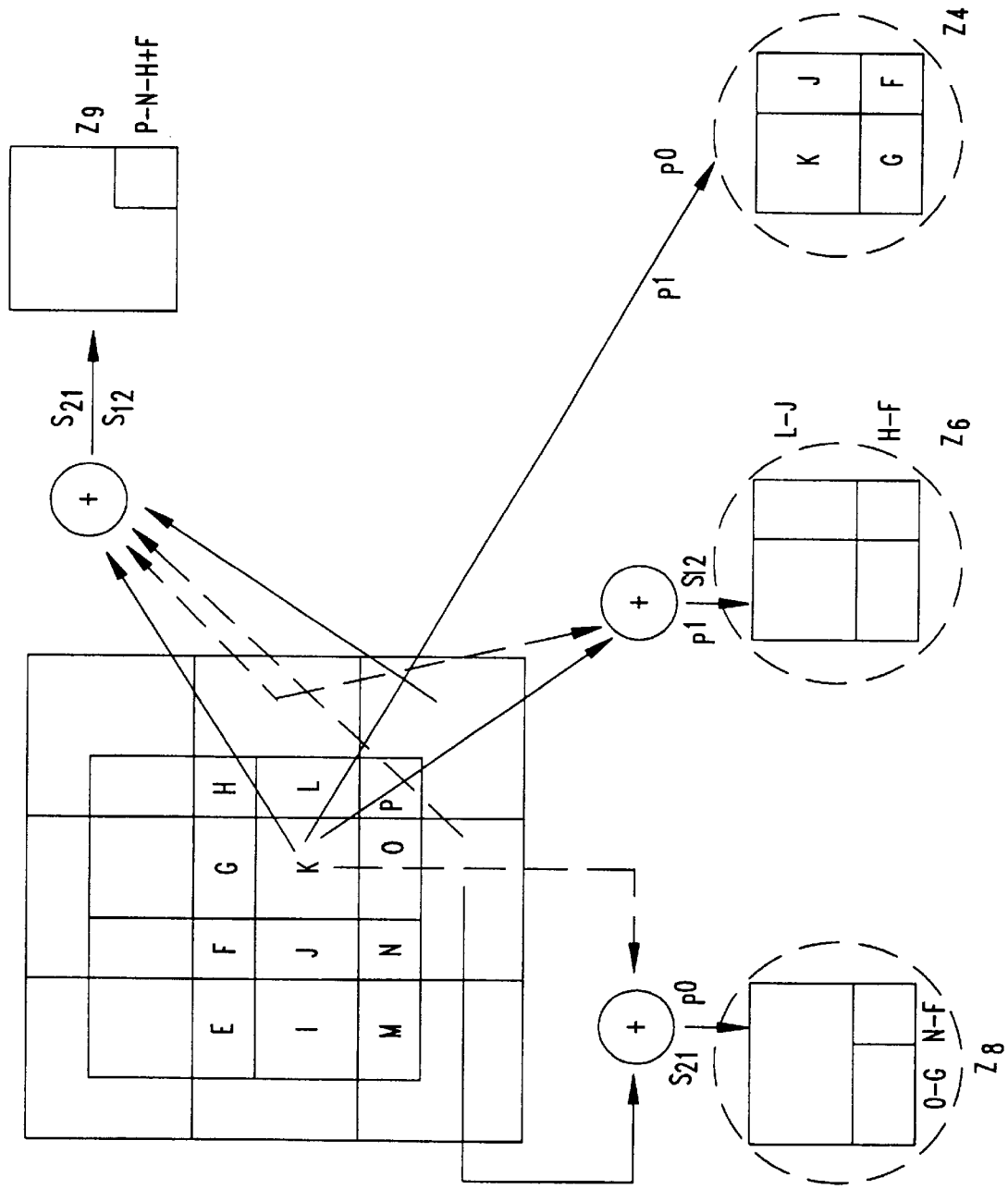
FIGS. 22 and 23 are block diagrams showing a preferred method for fast DCT domain inverse motion compensation of four adjacent blocks with same motion vectors using shared information in the four blocks to construct the block $Q^U$.
Figure 23:
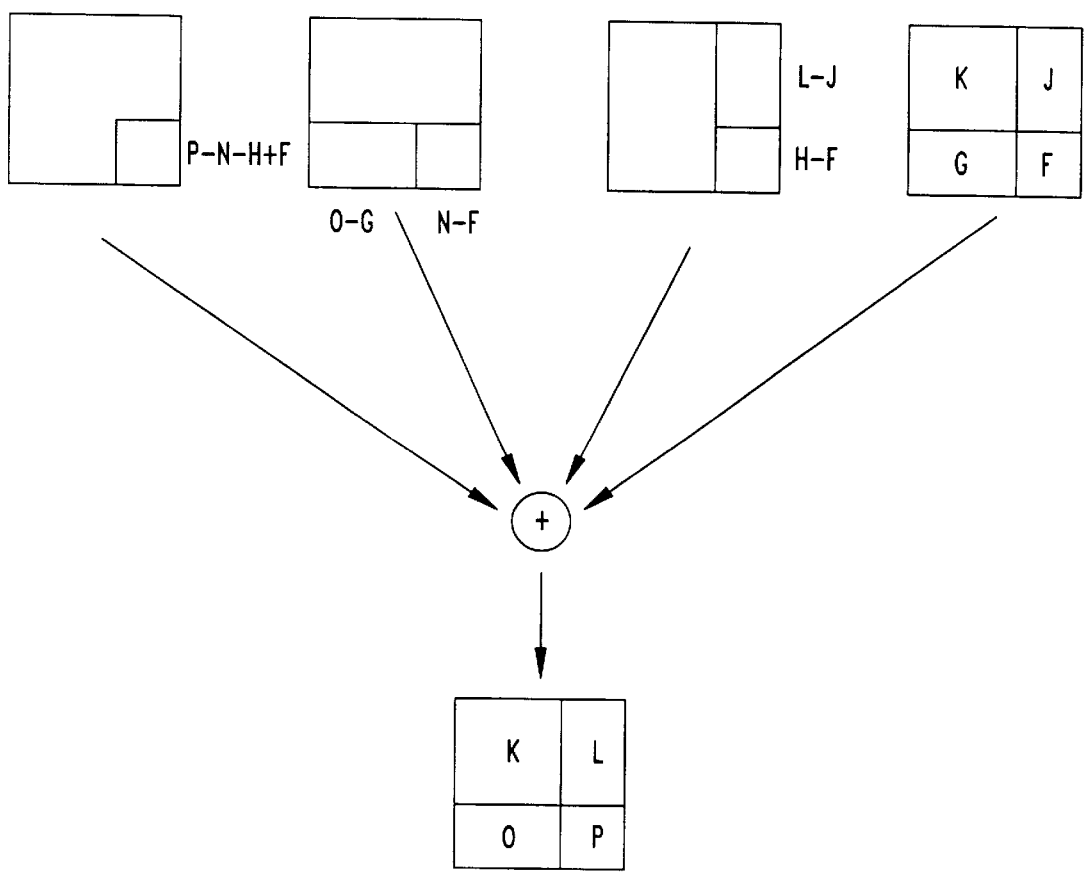

In FIG. 20, the combination and shifting of blocks to yield $Q^T$ is shown. Again, two of the four intermediate blocks can be reused ($Z_3$ and $Z_4$ from FIG. 16). In FIG. 22, the combination and shifting of blocks to yield $Q^U$ is shown. Here, three of the four intermediate blocks can be reused ($Z_8$ from FIG. 20, $Z_6$ from FIG. 18 and $Z_4$ from FIG. 16). The net effect is that only 9 pairs of pre and post matrix multiplications are needed for this preferred embodiment compared to 16 if each of the blocks $Q^M$, $Q^N$, $Q^T$ and $Q^U$ are treated separately.

A more rigorous explanation of FIGS. 20 through 23 is as follows. We write $Q^T$ and $Q^U$ as:

$$Q^T = \overline{\mathcal{P}_0 S_{21}(T_2 - T_3 - T_0 + T_1)S_{02}} + \overline{\mathcal{P}_0 S_{21}(T_3 - T_1)P^0} + \quad (48)$$

$$\overline{\mathcal{P}_0 X(M_2 - M_3)S_{02}} + \overline{\mathcal{P}_0 X M_3 P^0}$$

$$Q^U = \overline{\mathcal{P}_0 S_{21}(U_3 - U_2 - U_1 + U_0)S_{12}} + \overline{\mathcal{P}_0 S_{21}(T_3 - T_1)P^0} + \quad (49)$$

$$\overline{\mathcal{P}_0 X(N_3 - N_2)S_{12}} + \overline{\mathcal{P}_0 X M_3 P^0}$$

In DC+2AC approximation, we have shown that $\hat{Q}^M$ and $\hat{Q}^N$ can be computed with 46 multiplications (or 35 for frame prediction and anchor non-interlaced case). Since one of the two new terms of equation (48) includes a permutation matrix, the DC+2AC approximation of $\hat{Q}^T$ can be computed with only 14 (=9+5) multiplications. For the DC+2AC approximation of $\hat{Q}^U$, we need only 9 additional multiplications for the first term. Therefore, for the DC+2AC approximation of the whole macroblock, 69 multiplications are used (58 multiplications in frame prediction and anchor non-interlaced), resulting in 17.25 (14.5) multiplications per block. The preferred embodiment for fast computation of equation (31) thus yields about 50% (or 60%) improvement over the number of the multiplications over the method which requires 36 multiplications.

Applications of Reduced Images

The set of reduced images extracted from compressed video using this invention can be further used for video browsing. An example browsing technique using reduced images can be found in "On Fast Microscopic Browsing of MPEG compressed video" (by B. L. Yeo, IBM T. J. Watson Research Center, Technical Report RC20841, May 1997). Since the size of each reduced image is small compared to the full frame and to the compressed video itself (for example, a DC image of an MPEG-2 video at 4.0 Mbits/sec and encoded at a spatial resolution of 708 by 480 is of the size 88 by 60 and takens up only about 0.2 Mbits/sec. The set of DC images or a subset of the DC images can be further transmitted without using as much bandwidth from a server to a client for quick browsing purposes. The DC images can be further compressed to reduce the bit rate.

At browsing time, the reduced images can be played back one after the other on a graphical display (e.g., 200 in FIG. 2). The display 238 could either be a television or a computer monitor 238. Because there is no need to perform the computationally expensive decompression tasks, the DC images can be played back faster-than-realtime, i.e., for a 30 frames/sec video, the set of DC images can be played back faster than 30 frames/sec. This functionality allows a user to quickly skim through the video content. Furthermore, random access to other part of the video can be offered. With compressed video, random access is much more difficult and time-consuming. The reduced images can also serve as indices into the respective video segment. The indices could be visual in the sense that a user, by looking at selected reduced images (for example, one for each shot), can easily navigate to the respective shots. The indices could also be used for image-based matching.

Figure 24:
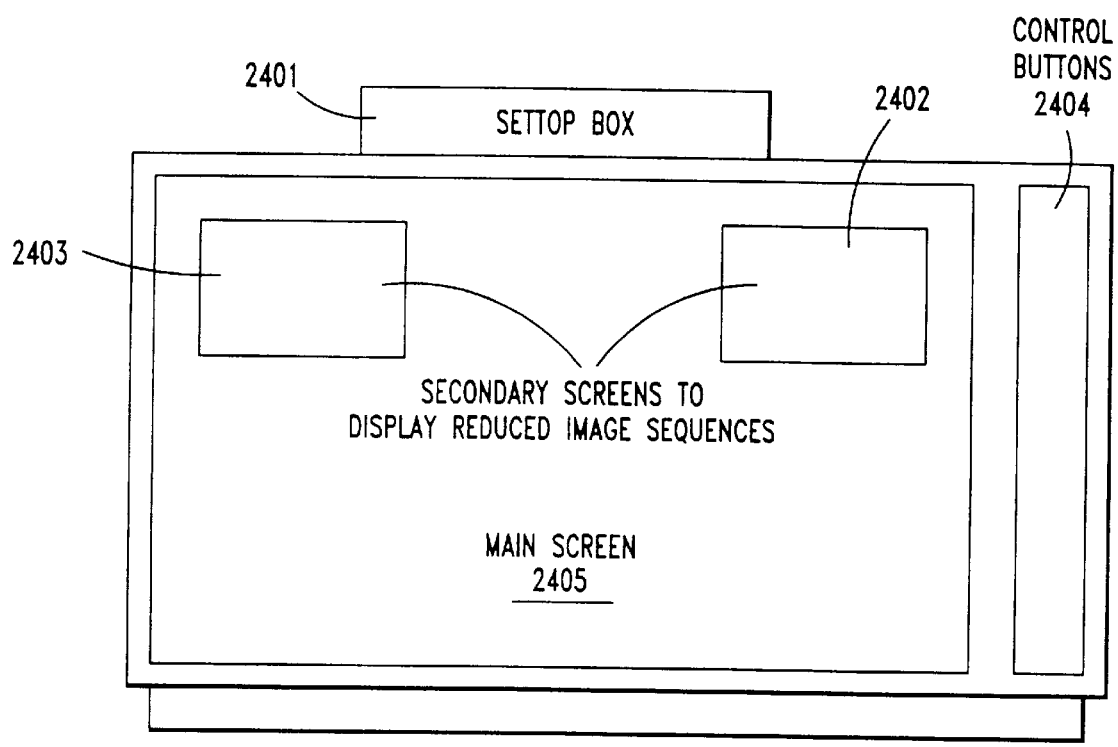
FIG. 24 is a TV screen which displays reduced image sequences.

FIG. 24 shows a block diagram for a TV which displays reduced image sequences. The screen composes of display of main TV program (2405) along with one or more windows to display reduced image sequences (2402, 2403). In the settop box 2401, there could be a regular MPEG-2 decoder for decoding the full size display of the main TV program. Furthermore, the settop box 2401 could also contain one or more reduced image extractor (processes 300, 360 and 370) from MPEG-2 video. The reduced image extractors can then be used to display multiple views of the same TV program (e.g., different camera views of the same sporting event) or to simultaneously show different programs, possibly from different channels. The control buttons 2404 can be used (via a remote control for example) can be used to turn the display of the reduced images from the other programs on or off or to switch to different programs for display in the addition windows (e.g., 2402 and 2403). The reduced image extractor in the settop is of much lower cost compared to a full MPEG-2 coder, and thus adding a few of the extractor does not significantly increase the cost of the settop boxes, yet provides better TV viewing and channel-surfing experience for the viewers.

Given this disclosure alternative equivalent embodiments will become apparent to those skilled in the art. These embodiments are also within the contemplation of the inventors.

We claim:

1. A system for extracting spatially reduced image sequences in a motion compensated compressed format that supports the coding of interlaced frames, comprising:

a sequence of motion compensated compressed video frames each with a plurality of pixels, the sequence defined by a bit stream, stored in a memory, each frame coded in an intraframe format and each frame having one or more intra-coded blocks containing one or more frequency components created by a Discrete Cosine Transform (DCT) of the pixels in the frame, a plurality of said intra-coded blocks forming a macroblock;

an extractor, executed by a processor, that performs one of an interlacing and a deinterlacing operation on said macroblock and traverses the bit stream and selects a subset of the frequency components from one or more of the intra-coded blocks within said macroblock; and a constructor, executed by the processor, creates combinations of the frequency components in the subset to construct one or more spatially reduced images in a second sequence, each spatially reduced image having a plurality of second pixels.

2. A system, as in claim 1, where one or more of the second pixels is created using a weighted linear combination of a DC and one or more AC frequency components of one or more of the intra-coded blocks.

3. A system, as in claim 2, where the AC frequency components are the AC01 and AC10 frequency components.

4. A system, as in claim 2, where one or more of the intra-coded blocks has a coding that is one of a field-coded and a frame-coded.

5. A system, as in 4, where one or more weights of the weighted linear combination depend on whether the intra-coded macroblock containing the frequency components is frame-coded or field-coded.

6. A system, as in 2, where the spatially reduced image is a DC image.

7. A system, as in 2, where the spatially reduced image is a DC+2AC image.

8. A system, as in claim 1, where the spatially reduced image sequences are transmitted over a network.

9. A system, as in claim 1, where the spatially reduced image sequences are compressed.

10. A system, as in claim 1, where the spatially reduced image sequences are played in a viewed sequence on a graphical display.

11. A system, as in claim 10, where the graphical display is a television.

12. A system, as in claim 10, where one or more of the reduced images in the reduced image sequence is browsed.

13. A system, as in claim 10, where one or more of the reduced images in the reduced image sequence is indexed.

14. A system for extracting spatially reduced image sequences in a motion compensated compressed format supporting the coding of interlaced frames, comprising:

a sequence of motion compensated compressed video frames each with a plurality of pixels, the sequence defined by a bit stream, stored in a memory, each frame coded in one of an intraframe format and an intraframe format, the frames coded in the intraframe format having one or more inter-coded blocks, each inter-coded block being coded using motion compensation information with respect to one or more reference frames and using residues with respect to itself and one or more of the reference frames, and each intra-coded block containing one or more frequency components created by a Discrete Cosine Transform (DCT) of the pixels in the frame, a plurality of said intra-coded blocks forming a macroblock;

an extractor, executed by a processor, that traverses the bit stream and selects the motion compensation information from one or more of the inter-coded blocks and further selects a subset of the frequency components from one or more of the intra-coded blocks within said macroblock, the extractor using header information in the bit stream to identify the inter-coded and intra-coded blocks; and a constructor, executed by the processor, that uses the selected motion compensation information to determine how to create combinations of the frequency components in the subset to construct one or more spatially reduced inversely motion compensated images in a second sequence, each spatially reduced inversely motion compensated image having a plurality of second pixels.

15. A system, as in 14, where the spatially reduced image is a DC image.

16. A system, as in 14, where the spatially reduced image is a DC+2AC image.

17. A system, as in claim 14, where one or more of the second pixels are generated from one of the inter-coded frames using a weighted linear combination of a DC and one or more AC frequency components of one or more contributing anchor blocks in one or more reference frames where each contributing anchor block is determined by one or more motion vectors of one of the inter-coded blocks, the motion vector being part of the selected motion compensation information.

18. A system, as in claim 17, where each inter-coded block can be generated where the selected motion compensation information is field-based or frame-based motion compensation.

19. A system, as in claim 18, where the contributing anchor blocks in the reference frame can be frame or field coded.

20. A system, as in claim 19, where the weights in the weighted linear combination are determined from any one or more of the following:

(a) one or more of the motion vectors of the inter-coded blocks;

(b) the number of frequency components in the contributing anchor blocks;

(c) the selected motion compensation information; and (d) whether the contributing anchor blocks in the reference frame are frame coded or field coded.

21. A system, as in claim 17, where the AC frequency components are the AC01 and AC10 frequency components.

22. The system in claim 14, wherein said extractor performs one of an interlacing and a deinterlacing operation on said macroblock.

* * * * *